US012570299B2

(12) United States Patent
Sutton et al.

(10) Patent No.: US 12,570,299 B2
(45) Date of Patent: Mar. 10, 2026

(54) CONTROL SYSTEMS FOR VEHICLE CORNER MODULES AND METHODS OF OPERATION

(71) Applicant: REE AUTOMOTIVE LTD., Glil-Yam (IL)

(72) Inventors: Richard Sutton, York (GB); Ron Toledano, Tel Aviv (IL); Ohad Stauber, Raanana (IL); Eugen Layevski, Baden Baden (DE)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 18/272,411

(22) PCT Filed: Jan. 31, 2022

(86) PCT No.: PCT/IB2022/050833
§ 371 (c)(1),
(2) Date: Jul. 14, 2023

(87) PCT Pub. No.: WO2022/162639
PCT Pub. Date: Aug. 4, 2022

(65) Prior Publication Data
US 2024/0308447 A1 Sep. 19, 2024

Related U.S. Application Data

(60) Provisional application No. 63/144,313, filed on Feb. 1, 2021.

(51) Int. Cl.
*B60W 50/029* (2012.01)
*B60R 16/023* (2006.01)
(Continued)

(52) U.S. Cl.
CPC ....... *B60W 50/035* (2013.01); *B60R 16/0231* (2013.01); *B60R 16/0232* (2013.01);
(Continued)

(58) Field of Classification Search
CPC .... B60W 50/035; B60W 10/04; B60W 10/18; B60W 10/20; B60W 50/0205;
(Continued)

(56) References Cited

U.S. PATENT DOCUMENTS 5,752,748 A 5/1998 Schramm et al.
8,041,993 B2 10/2011 Matsubara
(Continued)

FOREIGN PATENT DOCUMENTS

JP H09505251 5/1997

OTHER PUBLICATIONS

PCT search opinion for PCT/IB2022/050833 which mailed on May 26, 2022.
(Continued)

*Primary Examiner* — B M M Hannan
(74) *Attorney, Agent, or Firm* — PEARL COHEN ZEDEK LATZER BARATZ LLP

(57) ABSTRACT

A control system is provided for a vehicle that includes a plurality of vehicle corner modules (VCMs) which each comprise at least two of: a drive subsystem, a steering subsystem, and a braking subsystem. The control system comprises a network of VCM-controllers that are onboard and installed within a different respective VCM and that are operatively linked to each one of the subsystems of its respective VCM to receive therefrom sensor data and to regulate operation thereof in response to incoming signals received from outside its respective VCM. The control system provides a no-fault operating mode defined by the absence of a control-system fault, and a VCM-controller of (Continued)

a first VCM is programmed to control, when operating in the no-fault operating mode, at least one subsystem in a second VCM.

18 Claims, 14 Drawing Sheets

(51) Int. Cl.

| | |
|---|---|
| *B60W 10/04* | (2006.01) |
| *B60W 10/18* | (2012.01) |
| *B60W 10/20* | (2006.01) |
| *B60W 50/02* | (2012.01) |
| *B60W 50/035* | (2012.01) |
| *B60W 50/04* | (2006.01) |

(52) U.S. Cl.
CPC ............ *B60W 10/04* (2013.01); *B60W 10/18* (2013.01); *B60W 10/20* (2013.01); *B60W 50/0205* (2013.01); *B60W 50/029* (2013.01); *B60W 50/045* (2013.01); *B60W 2050/0297* (2013.01); *B60W 2710/18* (2013.01); *B60W 2710/20* (2013.01)

(58) Field of Classification Search
CPC ............. B60W 50/029; B60W 50/045; B60W 2050/0297; B60W 2710/18; B60W 2710/20; B60R 16/0231; B60R 16/0232; B60R 16/023; B60L 3/0084; B60L 3/0092; B60Y 2306/13
See application file for complete search history.

(56) References Cited

U.S. PATENT DOCUMENTS

| | | | |
|---|---|---|---|
| 8,504,178 B2 | 8/2013 | Kakino | |
| 10,459,436 B2 | 10/2019 | Samii | |
| 11,046,330 B1 | 6/2021 | Katzourakis | |
| 11,180,207 B2 | 11/2021 | Sardes | |
| 11,190,533 B2 | 11/2021 | Tsurumi | |
| 11,267,522 B2 | 3/2022 | Sardes | |
| 11,279,243 B1* | 3/2022 | Ashraf | H02J 7/0016 |

| | | | |
|---|---|---|---|
| 11,465,636 B2 | 10/2022 | Sutton | |
| 11,479,313 B2 | 10/2022 | Sardes | |
| 11,524,667 B2 | 12/2022 | Orlov | |
| 11,845,455 B2 | 12/2023 | Sutton | |
| 2005/0113988 A1 | 5/2005 | Nasr | |
| 2005/0154497 A1 | 7/2005 | Strege | |
| 2006/0015231 A1 | 1/2006 | Yoshimura | |
| 2006/0212135 A1 | 9/2006 | Degoul | |
| 2008/0296106 A1 | 12/2008 | Nilsson | |
| 2009/0145674 A1* | 6/2009 | Lee | B60L 50/16 |
| | | | 333/182 |
| 2009/0189441 A1 | 7/2009 | Degoul | |
| 2015/0083508 A1 | 3/2015 | Bluethmann | |
| 2017/0057505 A1 | 3/2017 | Woodley | |
| 2018/0118048 A1* | 5/2018 | Gibson | B60L 50/16 |
| 2018/0194353 A1 | 7/2018 | Kilmurray | |
| 2018/0229609 A1* | 8/2018 | Hudson | B60L 58/20 |
| 2018/0345777 A1 | 12/2018 | Birnschein | |
| 2018/0370540 A1 | 12/2018 | Yousuf | |
| 2019/0041837 A1 | 2/2019 | Elenich | |
| 2019/0185025 A1* | 6/2019 | Kumar | B60L 58/21 |
| 2019/0250611 A1 | 8/2019 | Costin | |
| 2019/0291797 A1 | 9/2019 | Richards | |
| 2020/0070788 A1 | 3/2020 | Michels | |
| 2020/0217290 A1* | 7/2020 | Gibson | F02N 11/0866 |
| 2020/0233410 A1* | 7/2020 | Burns | B60L 50/66 |
| 2020/0298722 A1* | 9/2020 | Smolenaers | H02J 7/345 |
| 2021/0023960 A1* | 1/2021 | Niu | B60L 3/0084 |
| 2021/0155215 A1 | 5/2021 | Ganzel | |
| 2021/0158634 A1* | 5/2021 | Alla | B60W 50/045 |
| 2021/0284262 A1 | 9/2021 | Sardes | |
| 2022/0055586 A1 | 2/2022 | Orlov | |
| 2022/0089030 A1* | 3/2022 | Norberg | H02J 7/1423 |
| 2022/0137621 A1* | 5/2022 | Buttolo | G01S 19/42 |
| | | | 701/2 |
| 2023/0032858 A1 | 2/2023 | Sardes | |
| 2023/0271512 A1* | 8/2023 | Ashraf | B60L 50/66 |
| | | | 307/10.7 |

OTHER PUBLICATIONS

PCT search report for PCT/IB2022/050833 which mailed on May 26, 2022.

* cited by examiner

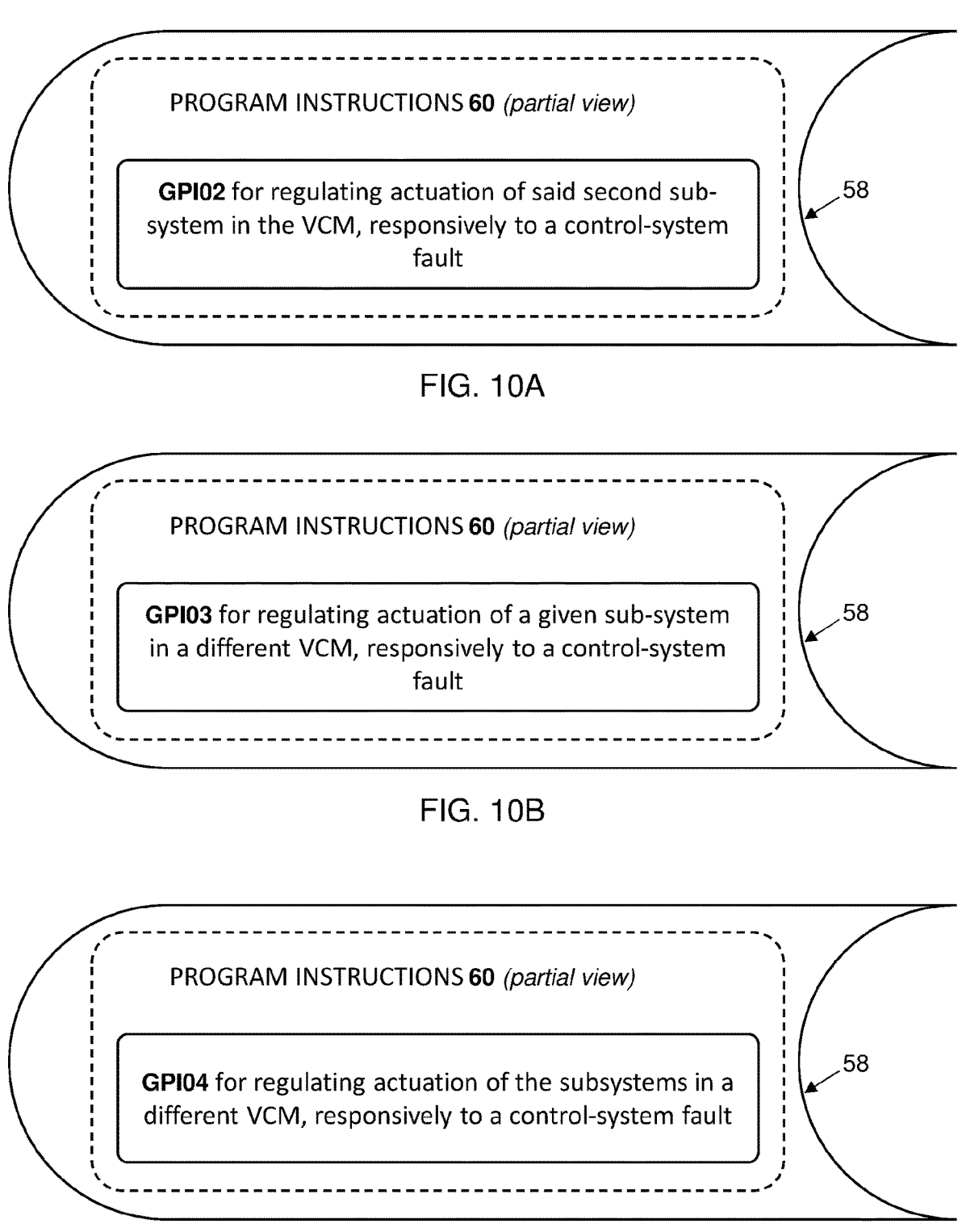

PROGRAM INSTRUCTIONS 60 *(partial view)*

GPI02 for regulating actuation of said second sub-system in the VCM, responsively to a control-system fault

PROGRAM INSTRUCTIONS 60 *(partial view)*

GPI03 for regulating actuation of a given sub-system in a different VCM, responsively to a control-system fault

PROGRAM INSTRUCTIONS 60 *(partial view)*

GPI04 for regulating actuation of the subsystems in a different VCM, responsively to a control-system fault

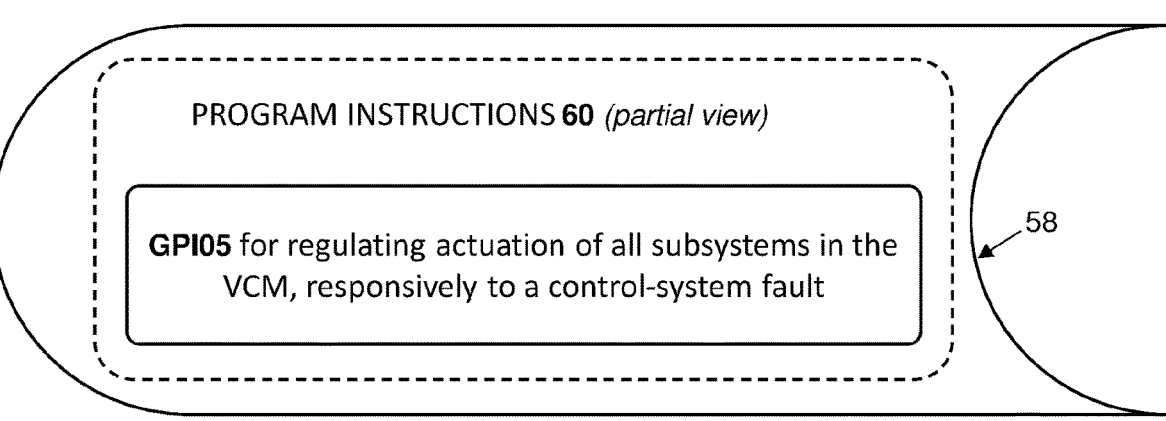

PROGRAM INSTRUCTIONS 60 *(partial view)*

GPI05 for regulating actuation of all subsystems in the VCM, responsively to a control-system fault

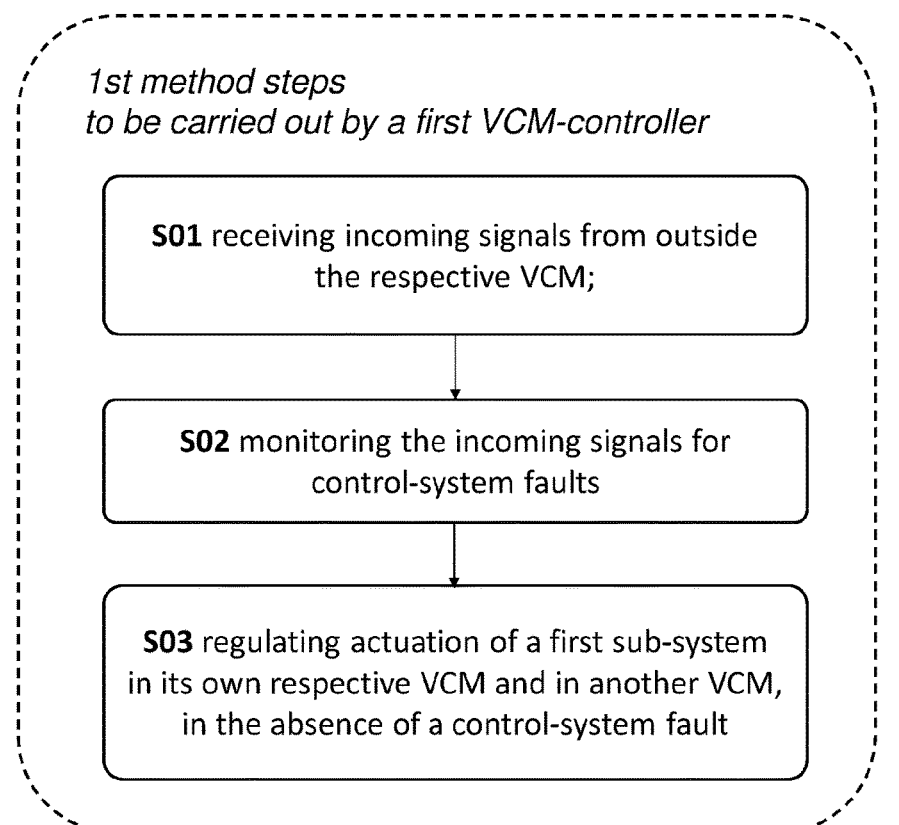

*1st method steps*
*to be carried out by a first VCM-controller*

S01 receiving incoming signals from outside the respective VCM;

S02 monitoring the incoming signals for control-system faults

S03 regulating actuation of a first sub-system in its own respective VCM and in another VCM, in the absence of a control-system fault

FIG. 11A

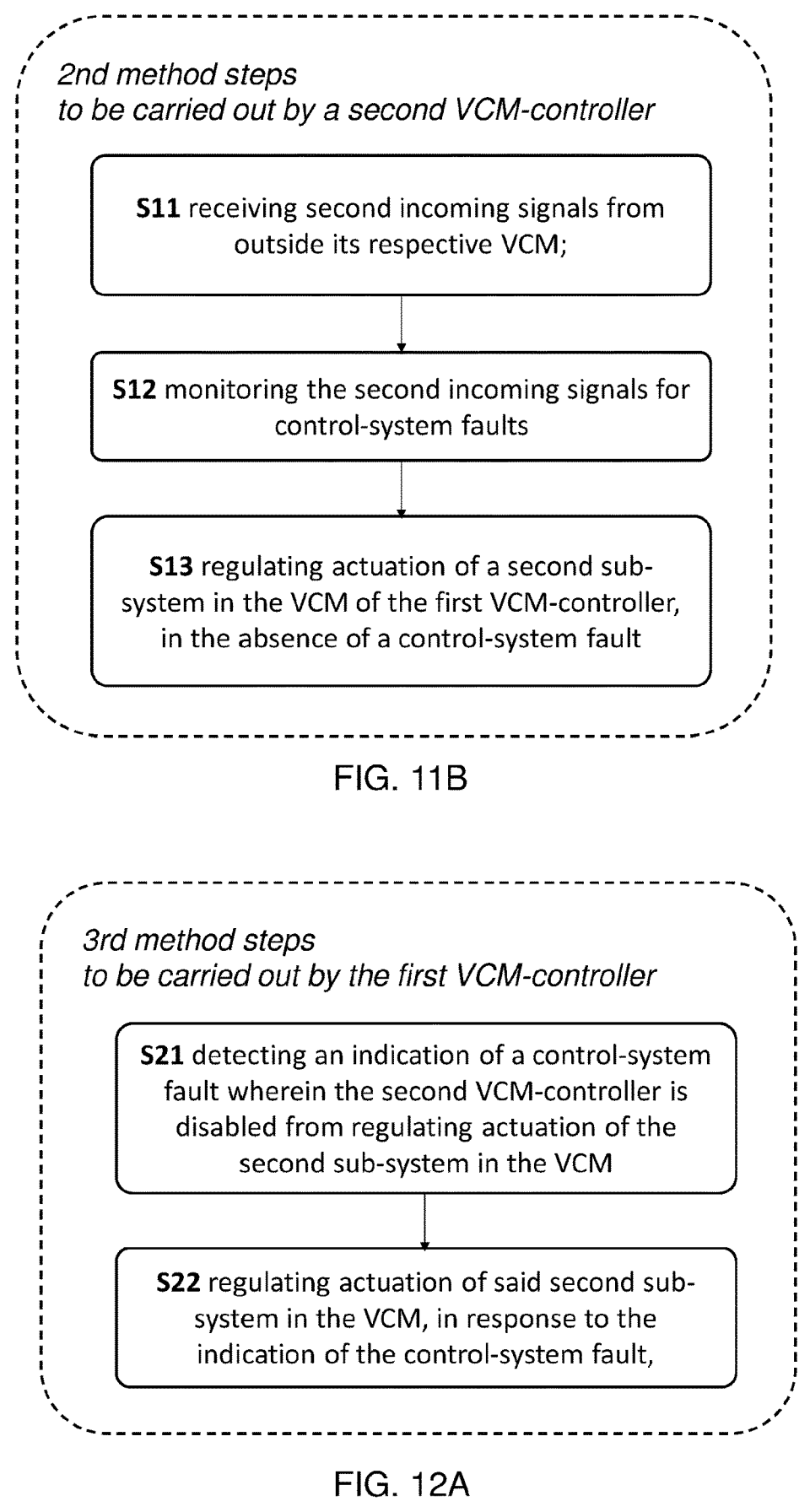

**2nd method steps
to be carried out by a second VCM-controller**

S11 receiving second incoming signals from outside its respective VCM;

S12 monitoring the second incoming signals for control-system faults

S13 regulating actuation of a second sub-system in the VCM of the first VCM-controller, in the absence of a control-system fault

FIG. 11B

**3rd method steps
to be carried out by the first VCM-controller**

S21 detecting an indication of a control-system fault wherein the second VCM-controller is disabled from regulating actuation of the second sub-system in the VCM

S22 regulating actuation of said second sub-system in the VCM, in response to the indication of the control-system fault,

FIG. 12A

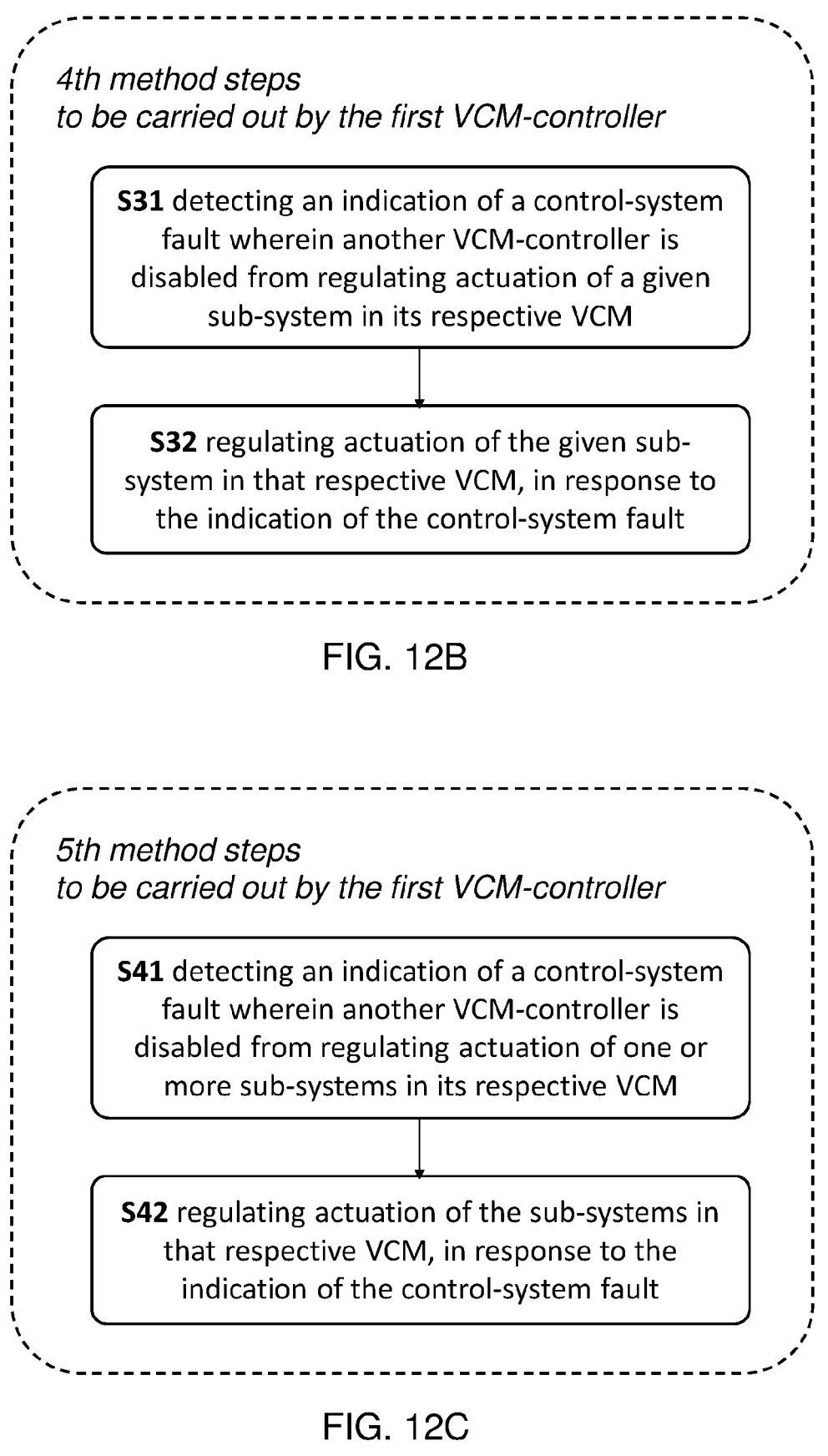

*4th method steps
to be carried out by the first VCM-controller*

S31 detecting an indication of a control-system fault wherein another VCM-controller is disabled from regulating actuation of a given sub-system in its respective VCM

S32 regulating actuation of the given sub-system in that respective VCM, in response to the indication of the control-system fault

FIG. 12B

*5th method steps
to be carried out by the first VCM-controller*

S41 detecting an indication of a control-system fault wherein another VCM-controller is disabled from regulating actuation of one or more sub-systems in its respective VCM

S42 regulating actuation of the sub-systems in that respective VCM, in response to the indication of the control-system fault

FIG. 12C

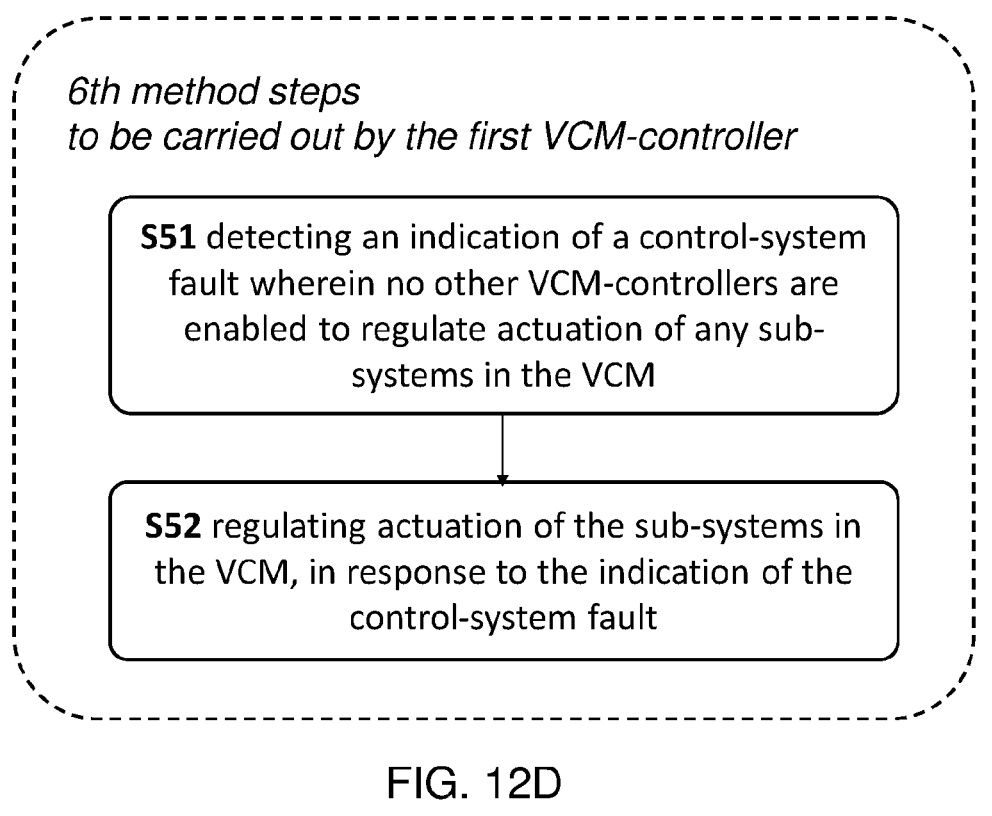

*6th method steps*
*to be carried out by the first VCM-controller*

S51 detecting an indication of a control-system fault wherein no other VCM-controllers are enabled to regulate actuation of any sub-systems in the VCM

S52 regulating actuation of the sub-systems in the VCM, in response to the indication of the control-system fault

FIG. 12D

CONTROL SYSTEMS FOR VEHICLE CORNER MODULES AND METHODS OF OPERATION

CROSS-REFERENCE TO RELATED APPLICATIONS

This application is a National Phase Application of PCT International Application No. PCT/IB2022/050833, filed on Jan. 31, 2025, which claims the benefit of U.S. Provisional Patent Application No. 63/144,313, filed on Feb. 1, 2021, which is incorporated herein by reference in its entirety.

FIELD OF THE INVENTION

The present invention relates to vehicle corner modules (VCMs) for regulating motion of host vehicles, and particularly to VCMs comprising onboard mechanical and electrical sub-systems of the VCMs.

BACKGROUND

Onboard vehicle systems have been developed and improved over the course of more than a century, resulting in sophisticated designs that integrate and centralize the management of the various mechanical and electrical subsystems. Available control systems are limited to managing individual functionalities and do not integrate or combine the management of multiple sub-systems.

Newly-conceived vehicle platforms designed for electric propulsion can include modular axle-less wheel assemblies (vehicle corner modules, or VCMs) requiring independent functional sub-systems such as drivetrain, braking, and steering sub-systems installed at individual wheels. These designs require new control models for safely managing the operation of the vehicles in both no-fault and fault conditions.

SUMMARY

A control system for a vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM.

In some embodiments, the no-fault operating mode can be characterized in that actuation in its own respective VCM of a second sub-system of the at least two sub-systems is regulated by a VCM-controller of a different VCM that is not its own respective VCM.

A control system for a vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, at least one sub-system of the at least two sub-systems in each respective VCM is regulated by a VCM-controller of a different VCM that is not the respective VCM, in response to the incoming signals.

A control system for a vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM, the no-fault operating mode being characterized in that actuation in its own respective VCM of a second sub-system of the at least two sub-systems is regulated by a VCM-controller of a different VCM that is not its own respective VCM.

For any one of the control systems disclosed herein, in a first fault-responsive operating mode, each VCM-controller installed in a VCM comprising said second sub-system can regulate actuation of said second sub-system in its own respective VCM, and/or the first fault-responsive operating mode can be characterized by the VCM-controller of the different VCM that is not its own respective VCM being disabled from regulating actuation of said second sub-system in the own respective VCM.

For any one of the control systems disclosed herein, in a second fault-responsive operating mode, a VCM-controller of a given VCM can regulate actuation of a given sub-system of the at least two sub-subsystems in a different VCM that is not the given VCM, and/or the second fault-responsive operating mode can be characterized by the VCM controller of the different VCM being disabled from regulating actuation, in the different VCM, of said given sub-system.

For any one of the control systems disclosed herein, in a third fault-responsive operating mode, a VCM controller of a given VCM can regulate actuation of the respective at least two subsystems in a different VCM that is not the given VCM, and/or the third fault-responsive operating mode can be characterized by the VCM controller of the different VCM being disabled from regulating actuation of one or more of the at least two sub-systems in the different VCM.

For any one of the control systems disclosed herein, in a fourth fault-responsive operating mode, a VCM controller of a given VCM can regulate actuation of the at least two subsystems in the given VCM, and/or the fourth fault-responsive mode can be characterized by a plurality of VCM-controllers of different respective VCMs, none of which are the given VCM, being disabled from regulating actuation of respective sub-systems of the at least two sub-systems in the respective VCM.

For any one of the control systems disclosed herein, said first sub-system can be selected in accordance with an operating profile assigned to the respective VCM.

For any one of the control systems disclosed herein, the incoming signals can be selected from the group of signals comprising electrical, electronic, and optically-transmitted signals.

Any one of the control systems disclosed herein can incorporate any or all of the features of the four disclosed fault-responsive operating modes in any combination.

A vehicle is disclosed according to embodiments of the invention, wherein the vehicle can comprise any one of the control systems disclosed herein.

A controller for installation onboard a vehicle corner module (VCM) is disclosed according to embodiments of the invention, wherein the VCM comprises at least two subsystems selected from the group of subsystems consisting of a drive subsystem, a steering subsystem, and a braking subsystem. The controller comprises: (a) communications arrangements for establishing electronic communication (i) with respective controllers of other VCMs so as to join a control-system network of networked VCM-controllers, and (ii) with each one of the at least two subsystems in the VCM and in at least one other VCM: (b) one or more processors; and (c) a computer-readable medium storing program instructions that, when executed by the one or more processors, cause the one or more processors to regulate, in the absence of a control-system fault-condition and responsively to incoming signals received from outside the VCM, actuation of a first sub-system of the at least two sub-systems in the VCM and in at least one other VCM.

In some embodiments, it can be that there exists a second sub-system of the at least two sub-systems in the VCM, the actuation of which is not regulated by the one or more processors when the stored program instructions are executed by the one or more processors, in the absence of a control-system fault indicating that a different networked VCM-controller is disabled from regulating actuation of said second sub-In system in the VCM. In some embodiments, it can be that there exists a second sub-system of the at least two sub-systems in the VCM, the actuation of which is not regulated by the one or more processors when the stored program instructions are executed by the one or more processors, subject to the controller receiving a control-system indication that a different networked VCM-controller is enabled to regulate actuation of said second sub-system in the VCM.

In some embodiments, the computer-readable medium can additionally store program instructions that, when executed by the one or more processors, cause the one or more processors to regulate actuation of said second sub-system in the VCM, responsively to a control-system fault indicating that the different VCM-controller is disabled from regulating actuation of said second sub-system in the VCM.

In some embodiments, the computer-readable medium can additionally store program instructions that, when executed by the one or more processors, cause the one or more processors to regulate actuation of a given sub-system of the at least two sub-subsystems in a different VCM comprising a respective networked VCM-controller, responsively to a control-system fault indicating that the respective VCM controller of the different VCM is disabled from regulating actuation of said given sub-system in the different VCM.

In some embodiments, the computer-readable medium can additionally store program instructions that, when executed by the one or more processors, cause the one or more processors to regulate actuation of the respective at least two subsystems in a different VCM comprising a respective networked VCM-controller, responsively to a control-system fault indicating that the respective VCM controller of the different VCM is disabled from regulating actuation of one or more of the at least two sub-systems in the different VCM.

In some embodiments, the computer-readable medium can additionally store program instructions that, when executed by the one or more processors, cause the one or more processors to regulation actuation of the at least two subsystems in the VCM, responsively to a control-system fault indicating that no other VCM-controllers of the network of VCM-controllers are enabled to regulate actuation of any sub-systems of the at least two subsystems in the VCM.

In some embodiments, the incoming signals can be selected from the group of signals comprising electrical, electronic, and optically-transmitted signals.

In embodiments, a controller can include any or all of the disclosed program instructions in any combination.

According to embodiments of the invention, a control system can comprise any one of the controllers disclosed herein. In some embodiments, a vehicle can comprise such a control system.

According to embodiments of the invention, a VCM can comprise any one of the controllers disclosed herein. In some embodiments, a vehicle can comprise at least one pair of such VCMs.

According to embodiments of the invention, a vehicle can comprise any one of the controllers disclosed herein.

A method is disclosed, according to embodiments, of operating a vehicle. According to the method, the vehicle comprises (i) at least one pair of vehicle corner modules (VCMs), each VCM comprising at least two subsystems selected from the group of subsystems consisting of a drive subsystem, a steering subsystem, and a braking subsystem, and (ii) a network of networked VCM-controllers, each VCM-controller being (A) onboard and installed within a different respective VCM, and (B) in electronic communication with each one of the at least two subsystems of its respective VCM and with other VCM-controllers of the network of VCM-controllers. The method comprises the following steps carried out by a first VCM-controller of the network of VCM-controllers: receiving incoming signals from outside its respective VCM: monitoring the incoming signals for control-system faults; and in response to the incoming signals and in the absence of a control-system fault, regulating actuation of a first sub-system of the at least two sub-systems in its own respective VCM and in at least one other VCM comprising a respective networked VCM-controller.

In some embodiments, the method can further comprise the following steps carried out by a second VCM-controller of the network of VCM-controllers: receiving second incoming signals from outside its respective VCM: monitoring the second incoming signals for control-system faults; and/or in response to the second incoming signals and in the absence of a control-system fault, regulating actuation of a second sub-system of the at least two sub-systems in the respective VCM of the first VCM-controller.

In some embodiments, the method can further comprise the following steps carried out by the first VCM-controller: detecting, in the incoming signals, an indication of a control-system fault according to which the second VCM-controller is disabled from regulating actuation of said second sub-system in the VCM; and/or, in response to the indication of the control-system fault, regulating actuation of said second sub-system in the VCM.

In some embodiments, the method can further comprise the following steps carried out by the first VCM-controller: detecting, in the incoming signals, an indication of a control-system fault according to which a different networked VCM-controller is disabled from regulating actuation of a given sub-system of the at least two sub-subsystems in its respective VCM; and/or, in response to the indication of the control-system fault, regulating actuation of said given sub-system in the respective VCM.

In some embodiments, the method can further comprise the following steps carried out by the first VCM-controller: detecting, in the incoming signals, an indication of a control-system fault according to which a different networked VCM-controller is disabled from regulating actuation of one or more sub-systems of the at least two sub-subsystems in its respective VCM; and/or, in response to the indication of the control-system fault, regulating actuation of the at least two sub-subsystems in the respective VCM.

In some embodiments, the method can further comprise the followings steps carried out by the first VCM-controller: detecting, in the incoming signals, an indication of a control-system fault according to which no other VCM-controllers of the network of VCM-controllers are enabled to regulate actuation of any sub-systems of the at least two subsystems in the VCM; and/or, in response to the indication of the control-system fault, regulating actuation of the at least two subsystems in the VCM.

In some embodiments of the method, the incoming signals can be selected from the group of signals comprising electrical, electronic, and optically-transmitted signals.

In embodiments, a method can comprise any or all of the method steps disclosed herein, in any combination.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 9A, 9B, 10A, 10B, 10C, and 10D are schematic diagrams of a VCM-controller, according to embodiments of the present invention:

FIGS. 11A and 11B show flowcharts of steps of a method for operating a vehicle in the absence of a control-system fault, according to embodiments of the present invention; and FIGS. 12A, 12B, 12C, and 12D show flowcharts of steps of a method for operating a vehicle in the presence of a control-system fault, according to embodiments of the present invention.

Figure 1:
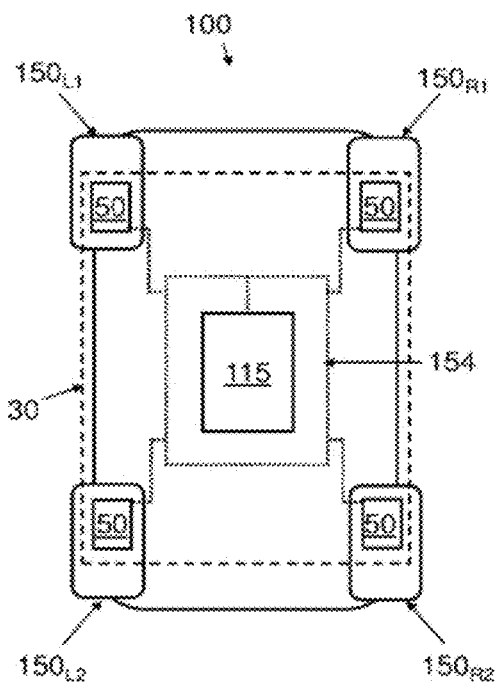
FIG. 1 is a schematic drawing of a vehicle comprising a communications bus, a plurality of VCMs, and a control system, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous elements.

DETAILED DESCRIPTION OF THE PRESENT INVENTION

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not: for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

According to embodiments of the invention, apparatus, systems, and methods are disclosed for operation of a vehicle in no-fault conditions, i.e., conditions in which no control-system fault has been identified and/or communicated, and in fault-responsive conditions, i.e., conditions in which a control-system fault has been identified and/or communicated. The apparatus and methods include a control system, a network of controllers and individual controllers. The methods are suitable for being carried out by the disclosed apparatus and systems.

More specifically, the embodiments relate to operation of a vehicle comprising a plurality of vehicle corner modules. Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic sub-systems, gearing assemblies, drive motors, driveshafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform, although the mounting need not necessarily be done 'as a unit'. When a VCM is described as being installed in/on a vehicle, then the VCM is mounted to the reference frame. A VCM may include a 'sub-frame' to which some or all of the VCM components are mounted or otherwise attached such that the sub-frame mediates between the reference frame and the various VCM components. The term "sub-frame" should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a motorized vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

As disclosed hereinbelow, operation of a vehicle, including regulating the actuation of one or more sub-systems performing operational functions, can be controlled and/or managed by one or more VCM-controllers. A VCM-controller is a controller installed onboard a VCM and programmed to regulate the actuation of at least one of the functional sub-systems at least in its own VCM. Some VCM-controllers are programmed, i.e., have access to program instructions executable by one or more processors of the VCM-controller, to regulate the actuation of a plurality of functional sub-systems in the VCM or of all the functional sub-systems in the VCM. As will be further described, in some embodiments of the invention, a VCM-controller can be additionally programmed to regulate the actuation of at least one of the functional sub-systems of one or more other VCMs. In embodiments, a VCM-controller can be additionally programmed to regulate the actuation of a plurality of functional sub-systems in the one or more other VCM or of all the functional sub-systems in the one or more other VCMs.

The expression 'regulate actuation' as used herein means to perform a control function that includes, but not exhaustively: activation, cessation, modulation, and management of a physical and/or electrical and/or electronic function. Regulating actuation can also include monitoring the operation and/or performance of a functional sub-system and actively performing or changing a control function in response to information received in the monitoring. Regulating actuation can also include any or all of: conducting test procedures on the regulated or controlled sub-systems, collecting operational and maintenance data on the regulated or controlled sub-systems, and maintaining and communicating status information of the regulated or controlled sub-systems.

The term "controller" as used herein means a computing device configured for monitoring, controlling, regulating and/or actuating one or more components, systems or sub-systems. A controller should be understood to include any or all of (and not exhaustively): one or more processors, one or more computer-readable media, e.g., transient and/or non-transient storage media, e.g., media containing program instructions for execution by the one or processors, communications arrangements, one or more power sources and/or a connection to a power source, and firmware and/or software. When used herein in a hyphenated expression such as vehicle-controller or VCM-controller, the term means a controller for controlling the vehicle and/or components and/or sub-systems of the vehicle, or a controller for controlling the VCM and/or components and/or sub-systems of the VCM, respectively. Unless specifically noted otherwise, a controller is installed in or on the controlled element (vehicle, VCM, etc.). For example, a VCM-controller is located in or on the VCM which is the primary VCM for control by that VCM-controller. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform said function. A VCM-controller, according to embodiments, can regulate actuation of a function, e.g., a function performed by a mechanical and/or electrical sub-system of a VCM: such regulation can be of the function in a VCM-controller's 'own respective VCM' or in any other VCM (or VCMs) with which the VCM-controller is in electronic communication: such electronic communication can be with a VCM-controller of the other VCM or VCMs and/or with any systems or sub-systems of the other VCM or VCMs. Regulating actuation of a function (or, equivalently, of a sub-system configured to perform such a function) can include the entire range of operations related to the function. In a non-limiting example, a drive function performed by a drive sub-system can include starting, accelerating, speed-keeping, slowing (e.g., using the engine mass or in concert with another sub-system such as, for example, a braking sub-system), and stopping. A VCM-controller can include multiple control modules, for example control modules that are programmed to control specific functions such braking, steering, etc.

In embodiments, a vehicle may be fully controlled through all aspects of the vehicle operation where all computing work is carried out by one or more of the computing units of the VCMs, i.e., the VCM-controllers. A VCM may be in active communication not only with the vehicle platform but also, or alternatively, with at least one other VCM. VCMs of a vehicle may be all of the same type, or may differ having same type at the front and having another type at the rear of the vehicle. In some other examples VCMs of one side may be of the same type and VCMs of the other side may be of a different type. For example, in a specific type of vehicle the front VCMs may be steerable and motorized while the rear VCMs may lack steering and/or motorizing capabilities. In another example, the VCMs may differ from each other by the sensors they are equipped with. In such embodiments VCMs that have more sensors may communicate relevant data to other VCMs lacking these sensors. In another example, the VCMs may differ from each other by having different performance profiles (e.g. size, response, power).

The terms "communications arrangements" or similar terms such as "communications schemes" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean: Wi-fi, Bluetooth, TransferJet, or Ultra-wideband; and wired communications bus technologies such as. CAN bus (Controller Area Network, Fieldbus, FireWire, HyperTransport and InfiniBand. "Establishing a communications link" as used herein means initiating and/or maintaining data communications between two or more processing units (e.g., controllers, computers, processors, etc.) in accordance with any of the communications protocols supported by the two or more communicating nodes.

As used throughout this disclosure and the claims appended hereto, the term "electrical signals" or similar terms such as "electrical inputs" means electrical and/or electronic, and includes any transmission of either direct or alternating electric current, of electronic information, or of any combination of electrical and electronic signals and information. As used throughout this disclosure and the claims appended hereto, the term "signals" without a modifier (such as, e.g., "electrical") means electrical, electronic and/or optically-transmitted signals but does not include mechanically transmitted 'signals', e.g., instructions. Examples of electrical signals included in the definition of 'signals' include any one or any combination of voltage, current, power, resistance and capacitance transferred or propagated so as to reach a VCM (including, in some examples, VCM-controller. By their nature, electrical signals (excluding electronic signals) are transferred over physical connections. Examples of electronic signals include any type or format of data communication transmitted over wire or wirelessly, and can include, and not exhaustively: specific or implicit instructions for actuation, regulation or cessation of operation of a VCM system or sub-system; sensor data and/or status, alarm/fault indications including fault-condition statuses and instructions; periodic, scheduled, and/or special status requests and messages; test messages; and diagnostic requests and results. Examples of optically-transmitted signals include, without limitation, the foregoing examples of electronic signals, although transmitted at least in part over optical communications infrastructure.

A "control system" as the term is used herein means a networked system that includes coordinated and/or networked plurality of controllers. In one example, a control system can include a network of VCM-controllers that comprises all of the VCM-controllers of a vehicle. In another example, the control system can additionally include a vehicle-controller. In other examples, the control system can additionally include other controllers such as, for example, a power management system, a battery management system, or a thermal management system. An autonomy computer can be present and in data communication with the control system.

According to embodiments, a control system can be configured such that in normal operation, i.e., in the absence of control-system faults, a first VCM-controller regulates the actuation of a first functional sub-system in its own respective VCM and in at least one other VCM. At the same time, a second VCM-controller regulates the actuation of a second functional sub-system in the VCM of the second VCM-controller as well as in the own respective VCM of the first VCM-controller. Such an arrangement has been found by the inventors to improve the overall performance of a control system by enabling a VCM-controller to control a given vehicle function (e.g., steering or braking) across multiple VCMs. When a control-system fault occurs, appropriate and timely responses are required in order to maintain the continued safe operation of the vehicle. Control-system faults can include controller faults and communications faults. Responses can be based on whether the sub-system affected is a fail-safe system or a fail-operational system. Reponses can be selected to ensure that a redundant component, e.g., a control module, is enabled within a fault-tolerant time interval.

Referring now to the figures, and in particular to FIG. 1, a vehicle 100 includes a communications bus 154 that connects respective VCM-controllers 50 to each other. In some embodiments, the communications bus 154 can additionally enable communication between the vehicle-controller 115 and any one or more (or all) of the VCM-controllers 50. An example of a communications bus 153 or 154 is a multi-master serial bus configured as a controller area network (CAN) bus. In some embodiments (not shown), physically separated and/or assigned, e.g. permanently or temporarily assigned, communications channels can be implemented between specific endpoints alongside the bus or as extensions of the bus. For example, a VCM-controller can be in such 'direct-channel' communications with sensors deployed within a respective VCM. As shown in the example of FIG. 1, a vehicle 100 can include multiple pairs of opposing VCMs 150, i.e., opposing wheels. In other examples (not shown) a vehicle can include just a single pair of VCMs while other wheels of the vehicle, if any, are implemented in other manners, e.g., using conventional arrangements for steering, drive, braking, and/or suspension systems. FIG. 1 also shows a control system 30 which includes four VCM-controllers $50_{L1}$, $50_{R1}$, $50_{L2}$, $50_{R2}$, and the vehicle controller 115, all interconnected by the communications bus 154.

Figure 2:
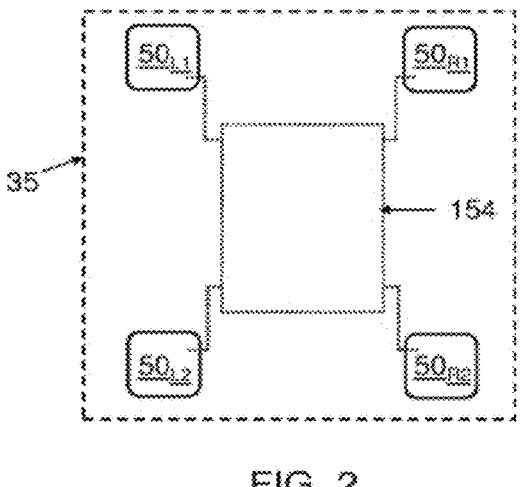
FIG. 2 shows a detail of a portion of the communications bus of FIG. 1, according to embodiments of the present invention.

FIG. 2 illustrates a network 35 of VCM-controllers 50, including VCM-controllers $50_{L1}$, $50_{R1}$, $50_{L2}$, and $50_{R2}$. They are shown in FIG. 2 as being interconnected by the communications bus 154, but other communications arrangements can also be suitable, such as, for example, direct communications links (not shown) between each pair of VCM-controllers, i.e., between VCM-controller pairs $50_{L1}$-$50_{R1}$, $50_{L1}$-$50_{R2}$, $50_{L1}$-$50_{R2}$, $50_{L2}$-$50_{R1}$, $50_{L2}$-$50_{R2}$, and $50_{R1}$-$50_{R2}$.

Figure 3:
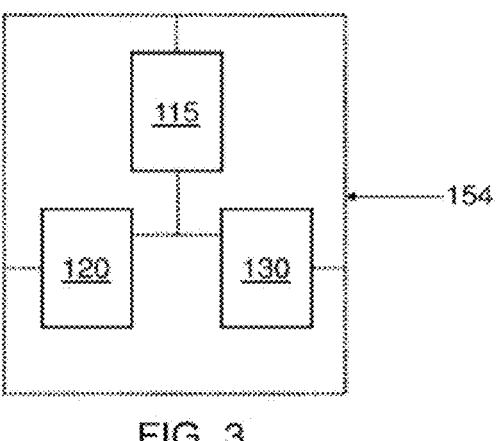
FIG. 3 shows a network of VCM-controllers of the vehicle of FIG. 1, according to embodiments of the present invention.

FIG. 3 shows a partial view of the communications bus 154 according to some embodiments, in which driver controls 130 and a main autonomy computer 120 are in electronic communication with other entities on the communications bus. In other examples, either driver controls 130 or a main autonomy computer 120 are in electronic communication with other entities on the communications bus. Non-limiting examples of information communicated by driver controls 130 can include steering instructions encoded from a driver-operated steering device such as a steering wheel, braking instructions encoded from a driver-operated braking device such as a brake pedal, and acceleration information encoded from a driver-operated acceleration device such as a gas pedal (accelerator). In various exemplary implementations of the invention, instructions transmitted to VCMs (including VCM-controllers) can be generated by driver controls 130, by an autonomy computer 120, or by both in any combination. A first non-limiting example of a combination includes instructions relating to a first function being propagated by driver controls 130 and instructions relating to a second function being propagated by an autonomy computer 120. A second non-limiting example of a combination includes instructions for given functions being propagated at one time by an autonomy computer 120 during a first mode of operation, e.g., highway driving, and propagated by driver controls 130 at another time during a second mode of operation, e.g., urban driving or emergency-mode driving.

Figure 4:
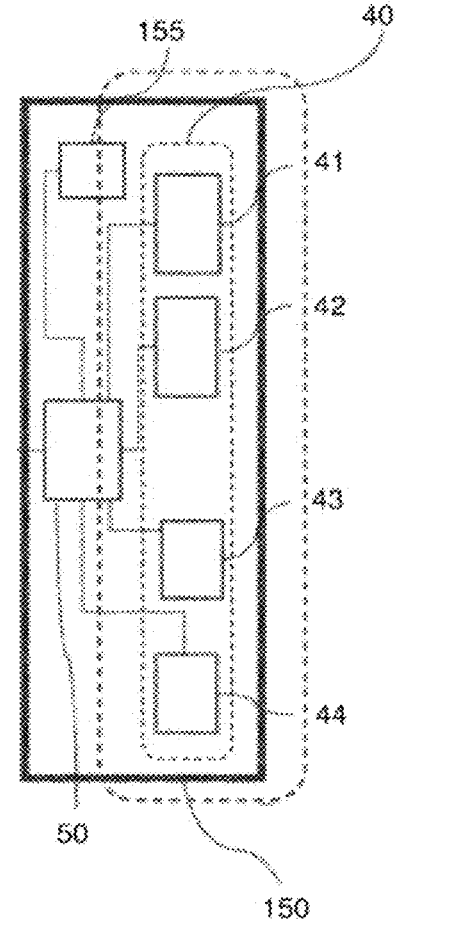
FIG. 4 is a schematic diagram of a VCM-controller comprising functional control modules, according to embodiments of the present invention.

Reference is made to FIG. 4, which shows a schematic diagram of control module architecture according to an embodiment, and not necessarily hardware architecture since control modules can include any combination of hardware, software, and firmware. A VCM 150 includes a group of sub-system control modules 40 which comprises: a suspension control module 41, a braking control module 42, a transmission control module 43, and a steering control module 44. In other embodiments, one or more of control modules 41, 42, 43, 44 may be absent. In still other embodiments, the group The VCM controller 50 is adapted to communicate with all other VCM sub-system control modules 40 and with VCM sensors 155. In addition, The VCM controller 50 may be in active communication with one or more control modules aboard a vehicle platform, e.g., vehicle controller 115 of FIG. 1.

According to some embodiments, one or more of the group of control modules 40 are designed to have merged components and functionality. In some embodiments, merging control modules is by sharing processing algorithms having shared operational parameters (e.g. rotational speed). In some embodiments, merged control units share a power source. In some embodiments, merged control units receive input from a common set of sensors (e.g. sensors included in VCM sensors 155). In some embodiments, merged control units are accommodated within a common mechanical compartment. In some embodiments, merging the control units 40 reduces the size of control units located within VCM 150. In some implementation examples of a VCM-controller 50, one or more of the individual control units 40 comprise separate physical entities. In other implementation examples, one or more of the individual control units 40 comprise different sets of software instructions stored in and executed by a VCM-controller.

Figure 5A:
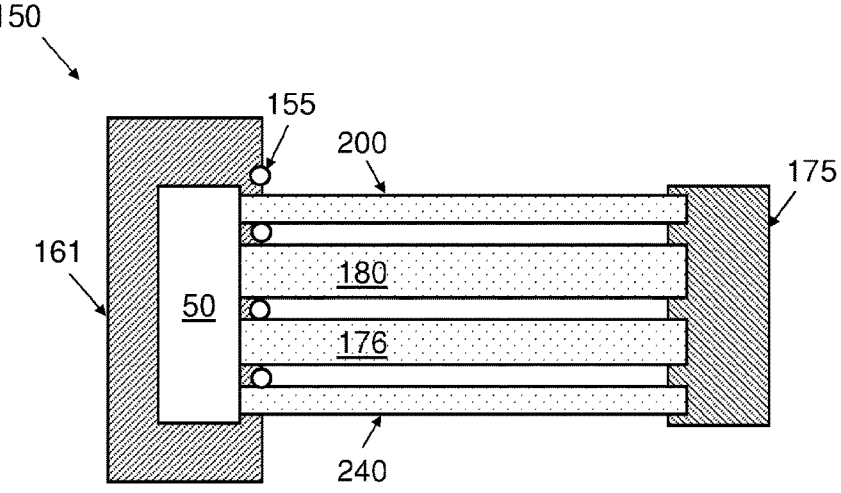
FIGS. 5A, 5B, and 5C are schematic illustrations of a VCM comprising a plurality of sub-systems, according to embodiments of the present invention.

We now refer to FIG. 5A. A VCM 150 according to embodiments includes a plurality of sub-systems each comprising mechanical and/or electrical components and designed to perform a function (or group of related functions). Each of the sub-systems is in contact with, or connected to mechanically and/or electrically, a sub-frame 161 and with a wheel interface 175. Wheel interface 175 is used to mount a wheel assembled to VCM 150. Wheel interface 175 may include, and not exhaustively: a wheel hub, an upright, a knuckle, a spindle, and/or a brake system support. The plurality of sub-systems of each VCM 150 are selected from amongst the following four sub-systems:

a. Steering sub-system 200, which can include any or all of the mechanical and/or electrical components required for steering, i.e., pivoting the wheel of the vehicle around a steering axis, including, and not exhaustively: a steering motor, a steering actuator, steering rods, steering system controller or control unit, steering inverter, and wheel-angle sensor. In embodiments, the VCM-controller 50 of the VCM 150 receives steering instructions as signals from the vehicle, e.g., electronic or optically-transmitted signals from a driver-operated steering mechanism or an autonomous steering unit, and carries out said instructions by causing, responsively to said instructions, the motion of a steering rod, e.g., via a steering actuator, to effect the turning of the wheel, for example, by regulating a current and voltage transmitted to the steering actuator and/or transmitting high-level instructions to a steering-system controller. The steering motor, actuator and/or inverter can receive electrical power from an external power source ('external' meaning external to the VCM), such as a battery pack installed in the chassis of the vehicle. A steering system control module 44, where applicable, can receive power either from a power source 59 of the VCM-controller 50 or from the external power source.

b. Drive system 180, which can include any or all of the mechanical and/or electrical components required for actuating a drive shaft to rotate the wheel of the vehicle to drive the vehicle, including, and not exhaustively: an electric drive motor, a driveshaft turned by the motor, and gearing assemblies to transmit the rotation to the wheel including, optionally, a single-hear or multi-gear transmission, as well as sensors such as a wheel speed sensor (in a non-limiting example, a rotary encoder). In some embodiments, the drive motor is included in the VCM, and in some embodiments, the drive motor is on the vehicle, e.g., installed on the chassis. In embodiments, the VCM controller 50 of the VCM 150 is configured to regulate an output of the motor and/or a rotational velocity of the wheel and/or a selection of a transmission gear, in response to instructions received via electrical inputs from the vehicle, e.g., from a driver-operated drive mechanism (e.g. an accelerator pedal) or an autonomous driving unit. In embodiments, the instructions include, for example, a current and a voltage for actuating the electric drive motor. In embodiments, the drive sub-system 180 can be used in a regenerative braking scheme in which the drive motor acts as a generator of electricity when the vehicle slows. Storage of the recuperated electricity can be in a vehicle-onboard energy storage device. In an example, a driver removes a foot from the accelerator pedal (or an autonomous drive system stops powering the drive wheels), and from that point the regenerative braking scheme begins to recuperate electrical energy generated by the slowing of the vehicle, i.e., as the turning of the generator translated via the drivetrain to a mechanical resistance force. In another example, the regenerative braking is boosted by friction braking, i.e., regular operation of the braking system 176, in response to the driver depressing the brake pedal (or receiving a brake-actuation instruction from an autonomous drive computer). In such an example, part of the energy used to brake the vehicle is lost to heat in the 'regular' friction braking arrangement, and at least a part of the energy is recaptured as stored electrical energy. In embodiments, 'cooperation' of the drive system 180 and the braking sub-system 176 in combining regenerative braking with friction braking can be controlled by the VCM-controller 50. In yet another example, in which the VCM-controller is configured (e.g., programmed) to control multiple sub-systems in cooperation with each other, the steering sub-system 200 can be used to assist in braking, i.e., in cooperation with the braking system, for example by turning the wheels so as to increase friction with a roadway, whether by steering symmetrically by having the opposing wheels turn in the same direction in tandem, or asymmetrically where the opposing wheels do not turn in tandem. In a similar example, the VCM-controller controls the steering sub-system 200 in concert with the braking system to mitigate the effect of brake pull caused by steering, a phenomenon also known as 'brake steer' or 'steering drift'. In yet another example, the VCM-controller controls, in concert, the drive system (with respect to regenerative braking), the braking system (with respect to friction braking) and the steering system (with respect to 'braking-by-steering') to achieve a desired braking effect.

c. Braking system 176, which can include any or all of the mechanical and electrical components for actuating a brake assembly (e.g., brake disk, brake caliper, etc.) including, optionally, one or more of a VCM-onboard hydraulic system, a VCM-onboard vacuum-boost system, or a hybrid brake-assist system incorporating a pressurized-gas accumulator and brake actuator. In embodiments, the VCM controller 50 of the VCM 150 is configured to regulate an output of the braking system, e.g., cause a braking action, in response to instructions received via electrical inputs from the vehicle, e.g., from a driver-operated braking mechanism (e.g. a brake pedal) or an autonomous braking unit.

d. Suspension system 240, which can optionally include an active suspension system controllable by the VCM-controller 50 (e.g., via a suspension-system control unit) of the VCM 150. In some exemplary implementations, there is no controllable suspension system installed in the vehicle and only three functional sub-systems are controlled according to the embodiments disclosed herein. In some other exemplary embodiments, control of a controllable suspension system is part of a group of control functions which can include any controllable functions that are not included in control of the drive/transmission system, steering system or braking system.

Figure 5B:
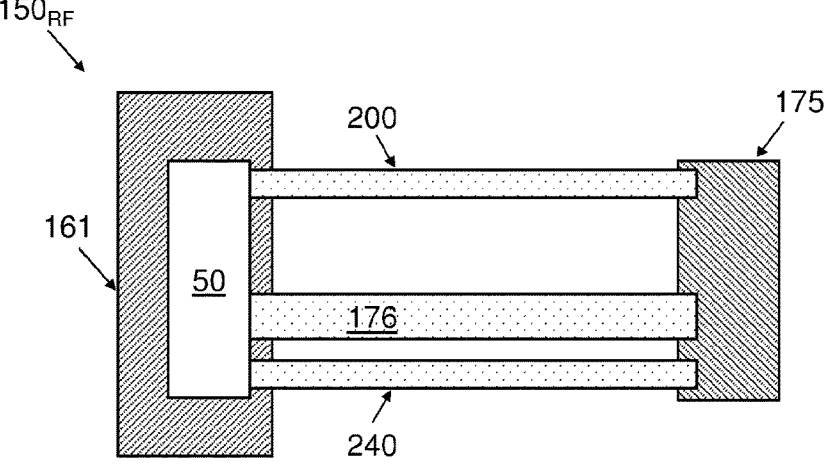
Figure 5C:
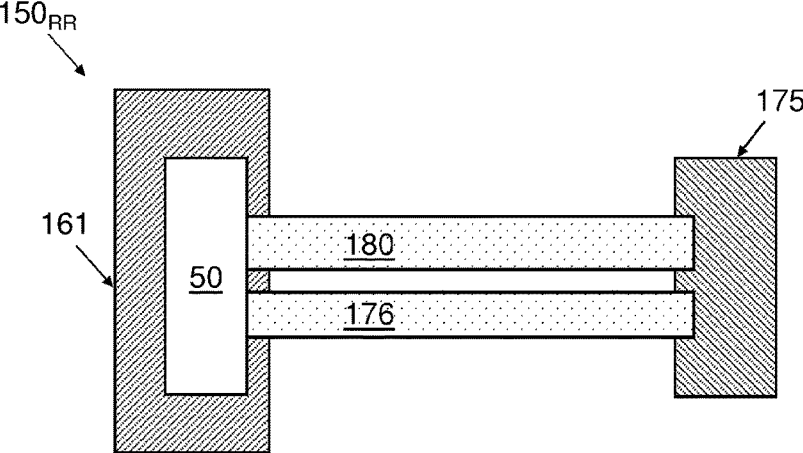

In some embodiments, the plurality of VCM sub-systems in any given VCM 150 includes all of the three or four sub-systems of paragraphs a.-d. In other embodiments, the plurality of VCM sub-systems in a given VCM 150 or in each VCM 150 of a given pair of opposing VCMs 150 can include a selected two sub-systems or a selected three sub-systems. In the non-limiting example of FIG. 5B, an illustrative VCM 150$_{RF}$ for installation as a right-front VCM 150 in a vehicle, includes a steering sub-system 200, a braking sub-system 176, and an active suspension system 240. In the non-limiting example of FIG. 5C, a VCM 150$_{RR}$ for installation as a right-rear VCM 150 in a vehicle, includes a drive sub-system 180 and a braking sub-system 176. In both examples, the included subsystems can be arranged such that they are entirely included in/on the VCM, in that all of the mechanical and electrical components necessary for respective functions can be onboard the VCM 150, with electrical transmission and communications arrangements passing from the vehicle to the VCM-controller and/or to the respective sub-systems (e.g., to their controllers, motors and/or actuators). The passing of electrical transmission and communications arrangements can be via the sub-frame 161 which is mounted to the 'host' vehicle.

Figure 6:
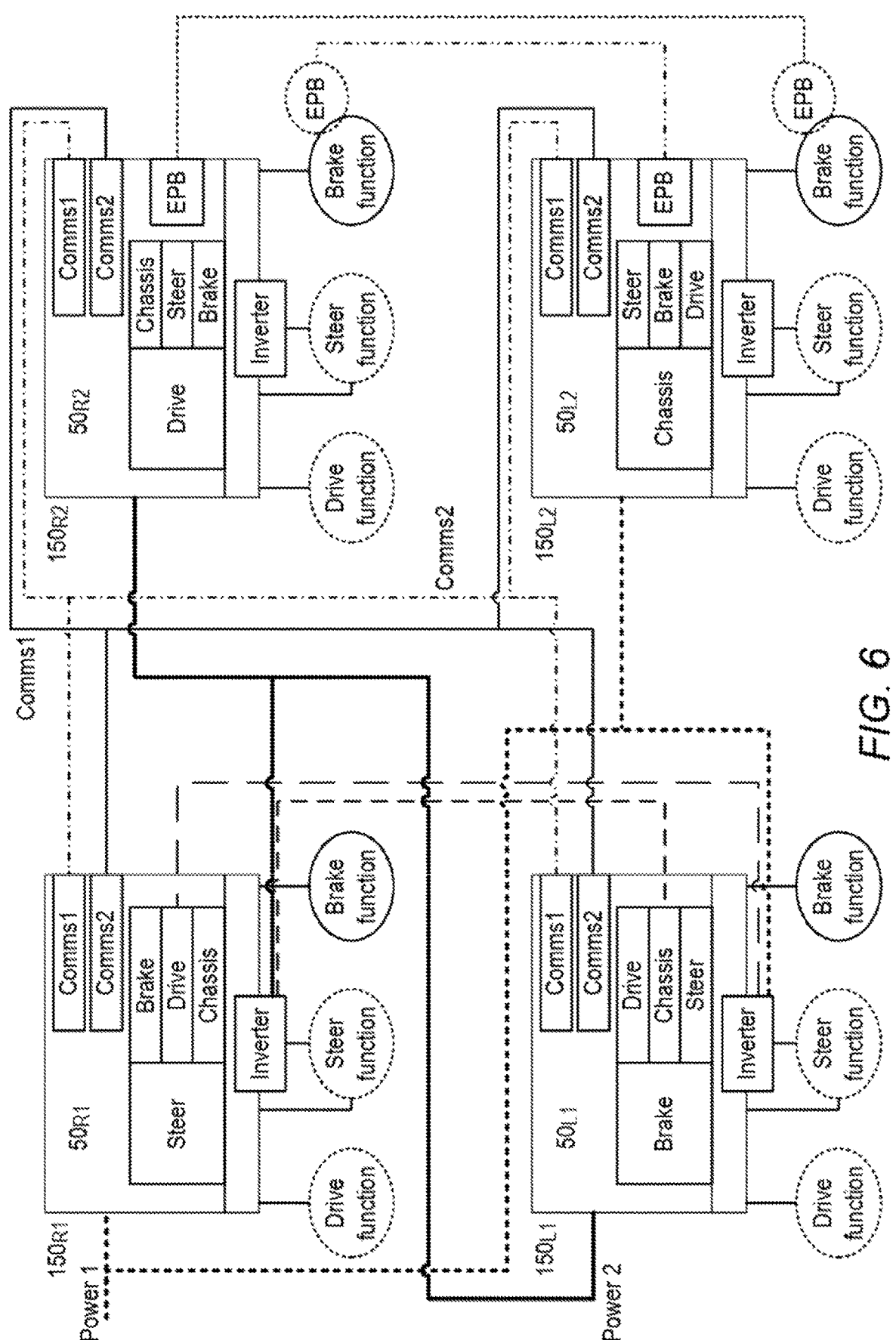
FIG. 6 shows a block diagram of a vehicle comprising four VCMs and four respective VCM-controllers, according to embodiments of the present invention.

Reference is made to FIG. 6, a block diagram of an exemplary implementation of various embodiments of the invention. In the diagram: VCM 150$_{R1}$ represents some components of a front-right VCM 150: VCM 150$_{L1}$ represents some components of a front-left VCM 150: VCM 150$_{R2}$ represents some components of a rear-right VCM 150; and VCM 150$_{L2}$ represents some components of a rear-left VCM 150. At each of the 4 VCMs, a corresponding VCM-controller 50 is shown to include four functional modules: Steer, Brake, Drive, and Chassis, in this case implemented as software modules, i.e., groups of program instructions, within the respective VCM-controllers 50. The 'Chassis' module is reserved for functional control of VCM functions not included in the first three modules. In one example, the Chassis module can include control of controllable suspension systems. While each VCM-controller 50 includes 4 functional modules, one module (the one shown in the largest box in each VCM block in FIG. 6) is given primacy in each VCM-controller. In the non-limiting example of FIG. 6, the Steer module (i.e., a steering control module 44) is shown in the largest box in the VCM box of right-front VCM 150$_{R1}$, indicating that it has been designated to control the steering sub-systems 200 in each one of the VCMs 150 of the vehicle, or, more specifically, in each one of the VCMs 150 of the vehicle that has a steering sub-system 200. Notably, each of the VCM-controllers 50 of the rear VCMs 150$_{R2}$ and 150$_{L2}$ are shown in FIG. 6 to include a steering module. According to embodiments, a functional control module can be included in a VCM-controller 50 of a VCM 150 that doesn't include the corresponding sub-system so as to provide redundancy for controlling the function in case of a control-system fault. Similarly to the Steer module in the VCM-controller of right-front VCM 150$_{R1}$, it can be seen in FIG. 6 that the Brake module (i.e., a braking control module 42) of left-front VCM 150$_{L1}$ is the designated primary controller for the braking function across all VCMs, that the Drive module (i.e., a drive/transmission control module 43) of right-rear VCM 150$_{R2}$ is the designated primary controller for the drive/transmission functions across all VCMs, and that the so-called Chassis module of left-rear VCM 150$_{L2}$ is the designated primary controller for other controllable functions such as, for example, controllable suspension systems. FIG. 6 also illustrates examples of redundant power and communications among the VCMs 150.

It can be understood from the non-limiting example of FIG. 6 that each VCM-controller can control a functional sub-system in its own respective VCM and control the same sub-system in at least one other VCM via the various communications arrangements. The nature of this arrangement means that in any given VCM, there can be a functional sub-system that is being controlled by a VCM-controller of a different VCM. In the example of FIG. 6, the steering system of left-front VCM 150$_{L1}$ is primarily controlled by the VCM-controller 50 of the VCM-controller of the right-front VCM 150$_{R1}$. In other examples, it can be that not all of the VCM-controllers operate in this manner and that only some of the VCM-controllers of a vehicle are designated or configured to control a functional sub-system in another VCM, and/or to have a functional sub-system in its own respective VCM controlled by a different VCM-controller.

The foregoing arrangement can be useful in 'normal', e.g., non-emergency or non-fault conditions, when all of the VCM-controllers and communications arrangement of the vehicle are operating normally. In anticipation of a fault condition in which a VCM-controller is disabled from performing one or more control functions, it can be desirable to design a control system to have built-in redundancy for each of the control functions, using appropriately-configured (e.g., programmed) VCM-controllers to provide redundancy. The term 'disabled' means that a fault in a controller, or (additionally or alternatively) a fault in a communications path, prevents the VCM-controller from performing the function. In some cases, the disabled-ness can be of short duration and recoverable, e.g., by self-diagnosis and/or restarting, and in other cases, the disabled-ness can be long-term and not recoverable without a servicing of the disabled component (e.g., VCM-controller or communications arrangements/bus).

A VCM-controller may identify a control-system fault, or receive an indication of another VCM-controller being 'disabled' from performing one or more control functions, in any one of a number of different ways. In embodiments, the VCM-controller may monitor incoming signals from outside the VCM—from the vehicle, e.g., an autonomy computer, driver controls or a vehicle-controller, and/or from other VCM-controllers in other VCMs—for the absence or presence of a control-system fault. For example, the sudden cessation of a signal from another VCM-controller, e.g., a signal regulating actuation of a functional sub-system, may trigger a response by a VCM-controller to take over the control function for that functional sub-system since it can no longer depend on the other VCM-controller to do the job. Alternatively, the VCM-controller may be configured (e.g., programmed) to allow the other VCM-controller to perform the control function unless actively informed. Additionally or alternatively, the VCM-controller may receive a signal actively indicating existence of a fault condition and that the VCM-controller must take over one or more control functions in its own respective VCM or in another VCM. Conversely, the VCM-controller can relinquish control of a sub-system to another VCM-controller upon receipt of a signal indicating that the other VCM-controller is enabled to perform the control function, where 'enabled means the opposite of 'disabled' as described hereinabove.

The terms 'receiving an indication' and similar terms such as 'receiving a signal indicating', as used herein do not necessarily mean that a signal-based instruction or data transmission is communicated with the specifics of the 'indication'. The term is meant broadly to mean that a controller receives, detects, accesses or computes (e.g., derives) information that was not available before receiving the 'indication'. In various non-limiting examples of 'receiving an indication', a VCM-controller, or any module thereof, may: detect a lack of response in another module or component, or, alternatively, detect a response in another module or component: detect a cessation, establishment/reestablishment or presence of a data stream, e.g., a data stream including control information and/or sensor information: or, via a subcomponent of the VCM-controller such as an instruction-input controller (e.g., an input 'selector') or instruction-output controller (e.g., an output 'stage'), detect or determine the validity or invalidity of a command function from within the VCM-controller or from another VCM-controller.

Figure 7A:
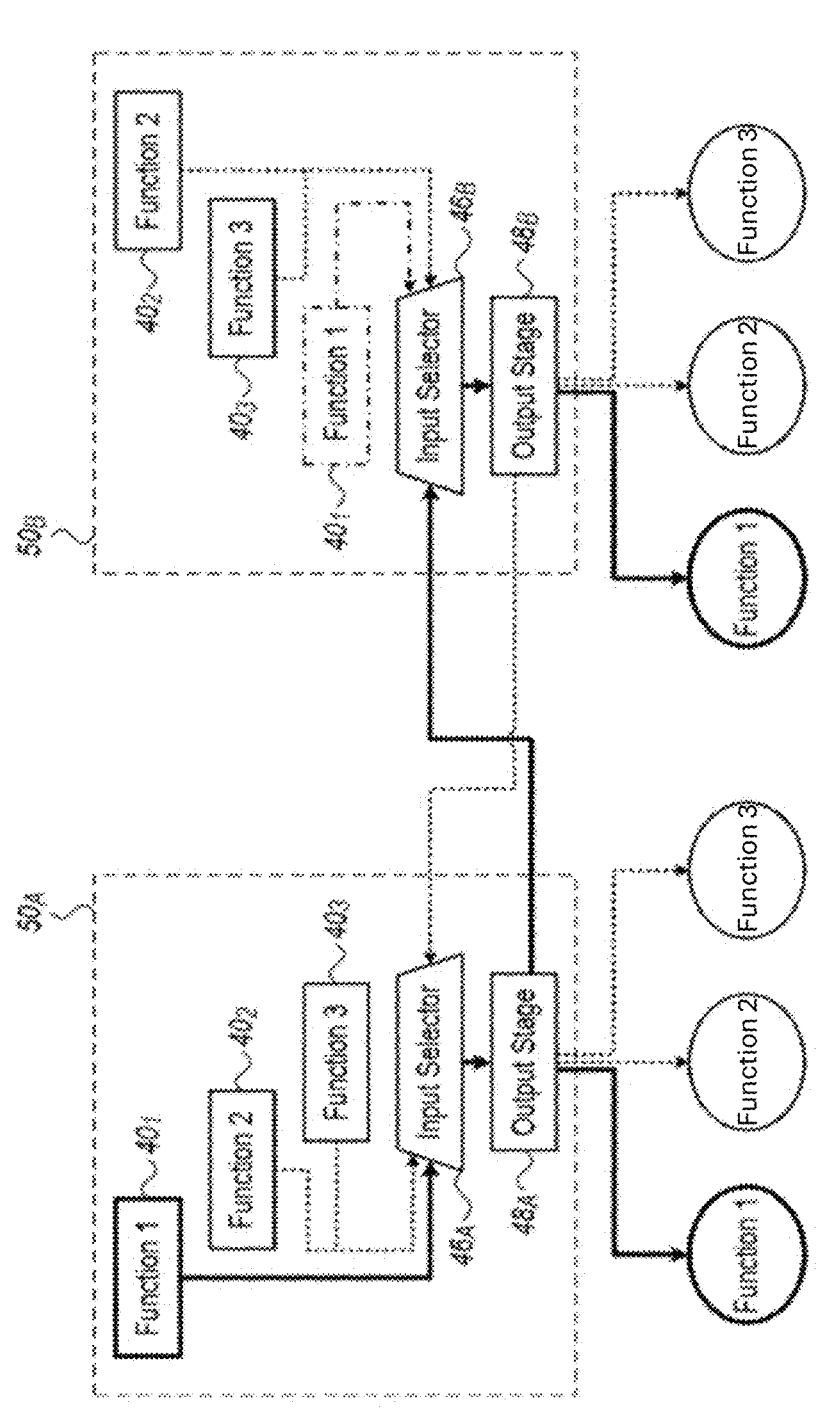
FIGS. 7A and 7B are block diagrams of a pair of VCM-controllers operating in the absence of a control-system fault, according to embodiments of the present invention.
Figure 7B:
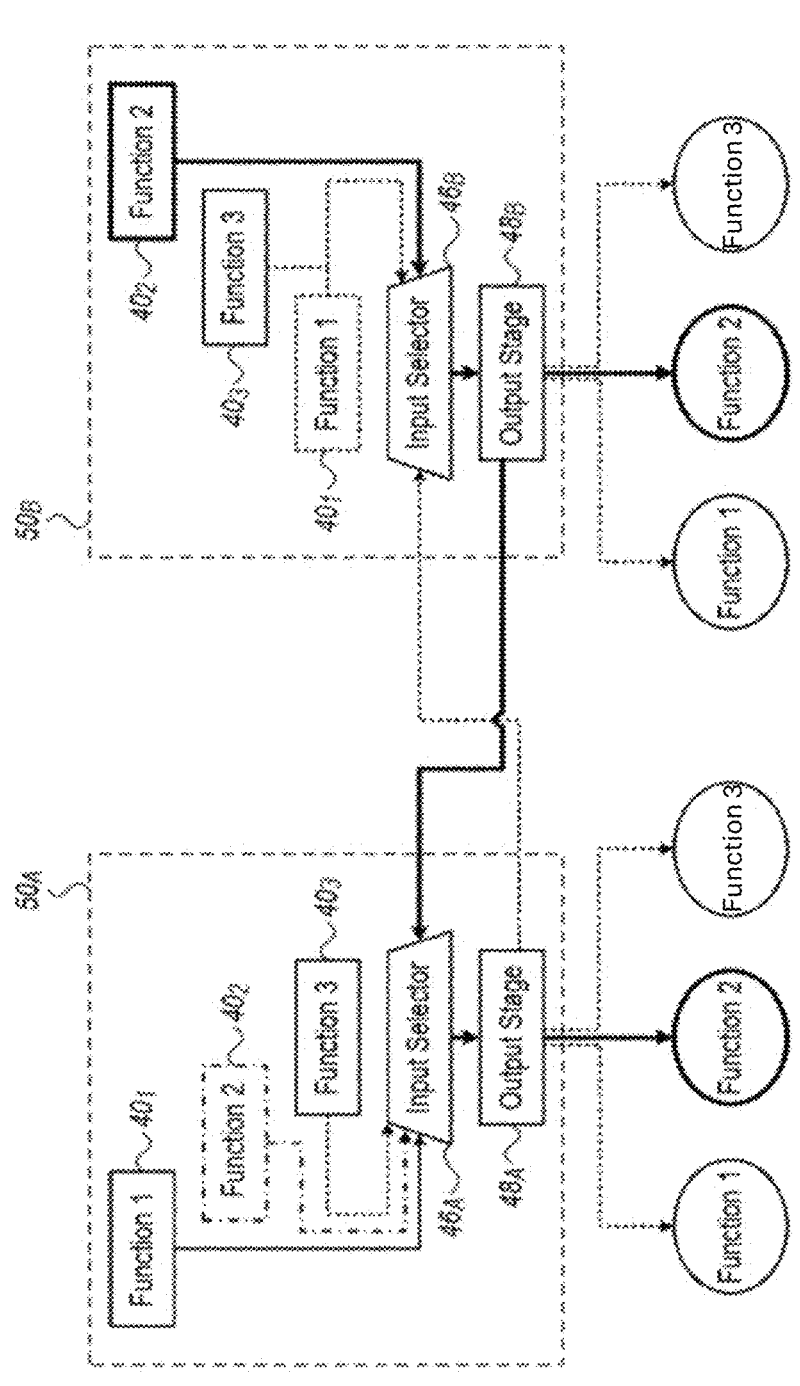

Reference is now made to FIGS. 7A and 7B, which schematically illustrate two VCM-controllers 50A, 50B, both members of a network of VCM-controllers acting together in a control system, operating in a no-fault condition. Each of the two VCM-controllers includes control modules 401, 402, 403 for controlling respective functions in the VCM (e.g., Function 1, Function 2). The first VCM-controller 50A has Function 1 designated, selected or assigned as its primary function, controlled by control module 401. In parallel, second VCM-controller 50B has Function 2 designated, selected or assigned as its primary function, controlled as indicated by control module 402 being first and largest. A respective input selector module 46 is configured to determine whether an internal command is valid, e.g., to determine whether a given VCM-connector enabled to issue the command to the corresponding functional sub-system. A respective output stage module 48 is effective to receive a valid command passed by the input selector and to route said command to the appropriate functional sub-system(s), i.e., in its own respective VCM and/or in a different VCM that is not the respective VCM.

FIG. 7A illustrates the control/instruction path for controlling Function 1. The first VCM-controller 50A issues Function 1 instructions, and they are deemed valid by the first input selector module 46A for both VCMs (and possibly of other VCMs which aren't shown in FIGS. 7A-7B). As indicated by the solid line from the Function 1 control module 401, the instructions of the first VCM-controller 50A are forwarded by the first input selector module 46A to (a) the first output stage module 48A for controlling the actuation of the Function 1 sub-system in the first VCM (its own respective VCM), and (b) the second input selector module 46B, the latter passing on the validated instructions to the second output stage module 48B for controlling the actuation of the Function 1 sub-system in the second VCM. Notably the Function 1 control module 401 in the second VCM-controller 50B may or may not attempt to issue instructions to the Function 1 sub-system(s), the path shown as an 'inactive/irrelevant' dashed line, but if such instructions are issued, they are not honored by either output stage 48A or 48B.

FIG. 7B illustrates the control/instruction path for controlling Function 2. The second VCM-controller 50B issues Function 2 instructions, and they are deemed valid by the second input selector module 46B for both VCMs (and possibly of other VCMs which aren't shown in FIGS. 7A-7B). As indicated by the solid line from the Function 2 control module 402, the instructions of the first VCM-controller 50B are forwarded by the second input selector module 46B to (a) the second output stage module 48B for controlling the actuation of the Function 2 sub-system in the second VCM (its own respective VCM), and (b) the first input selector module 46A, the latter passing on the validated instructions to the first output stage module 48A for controlling the actuation of the Function 1 sub-system in the first VCM. Notably the Function 2 control module 402 in the first VCM-controller 50A may or may not attempt to issue instructions to the Function 2 sub-system(s), the path shown as an 'inactive/irrelevant' dashed line, but if such instructions are issued, they are not honored by either output stage 48B or 48A.

Control-System Faults

Control-system faults include unexpected situations such as partial and complete failures of controllers, e.g., VCM-controllers, and electronic and physical failures of communications infrastructure. Each of the following four illustrative use-case examples involves a different control-system fault, and includes an exemplary solution according to one or more embodiments of the invention: each exemplary solution illustrates certain aspects of the control systems disclosed herein, as non-limiting examples of applications of the embodiments.

Use case example 1. A first VCM-controller in a first VCM receives an indication of a control-system fault according to which a second VCM-controller, the one that 'normally', i.e., in the absence of a control-system fault, controls a given functional sub-system in the first VCM, suddenly and without warning, is unable to perform, or is disabled from performing, that given control function in the first VCM. The first VCM-controller may or may not be aware of the root cause of the problem, e.g., whether it's a controller failure or a communications failure. The first VCM-controller, which has already been performing the control function for a different functional sub-system in the first VCM, now takes over the control function for the given functional sub-system in the first VCM, which until now had been controlled by the second VCM-controller. Additional actions may be taken by the control system to ensure continued safe operation and/or a safe stop of the vehicle.

Use case example 2. A first VCM-controller receives an indication of a control-system fault according to which a second VCM-controller, suddenly and without warning, is unable to perform, or is disabled from performing, a given control function in the second VCM, i.e., control of a given functional control system which the second VCM-controller was controlling in the second VCM up until the occurrence of the control-system fault. The first VCM-controller, regardless of whether it has until now been performing the given control function in the first VCM or in any other VCM, now takes over the control function for the given functional sub-system in the second VCM from the second VCM-controller which has suddenly been disabled from doing it. Additional actions may be taken by the control system to ensure continued safe operation and/or a safe stop of the vehicle.

Use case example 3. A first VCM-controller receives an indication of a control-system fault according to which a second VCM-controller, suddenly and without warning, is unable to perform, or is disabled from performing, at least one, or perhaps all, of the control functions in the second VCM. The first VCM-controller now takes over the control function for all of the functional sub-systems in the second VCM. Additional actions may be taken by the control system to ensure continued safe operation and/or a safe stop of the vehicle.

Use case example 4. A first VCM-controller receives an indication of a control-system fault according to which every other VCM-controller that had been tasked with controlling a functional-sub-system in the first VCM is unable to perform, or is disabled from performing, such control functions in the first VCM. The first VCM-controller may or may not be aware of the root cause of the problem, e.g., whether it's a controller failure, a communications failure, or a combination of both. The first VCM-controller now takes over the control function for all of the functional sub-systems in the first VCM, i.e., it's own respective VCM. Additional actions may be taken by the control system to ensure continued safe operation and/or a safe stop of the vehicle.

Figure 8A:
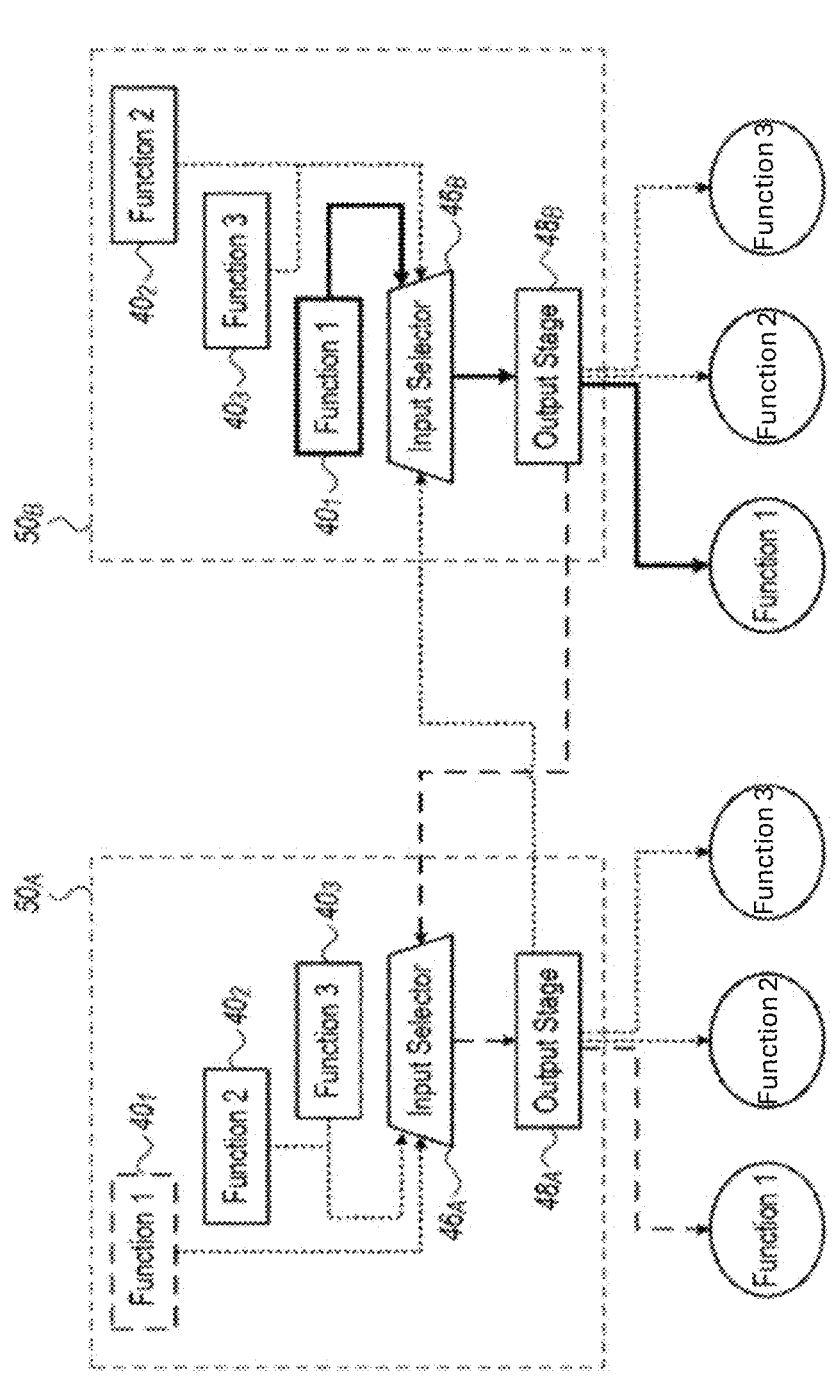
FIGS. 8A, 8B, and 8C are block diagrams of a pair of VCM-controllers operating in the presence of a control-system fault, according to embodiments of the present invention.
Figure 8B:
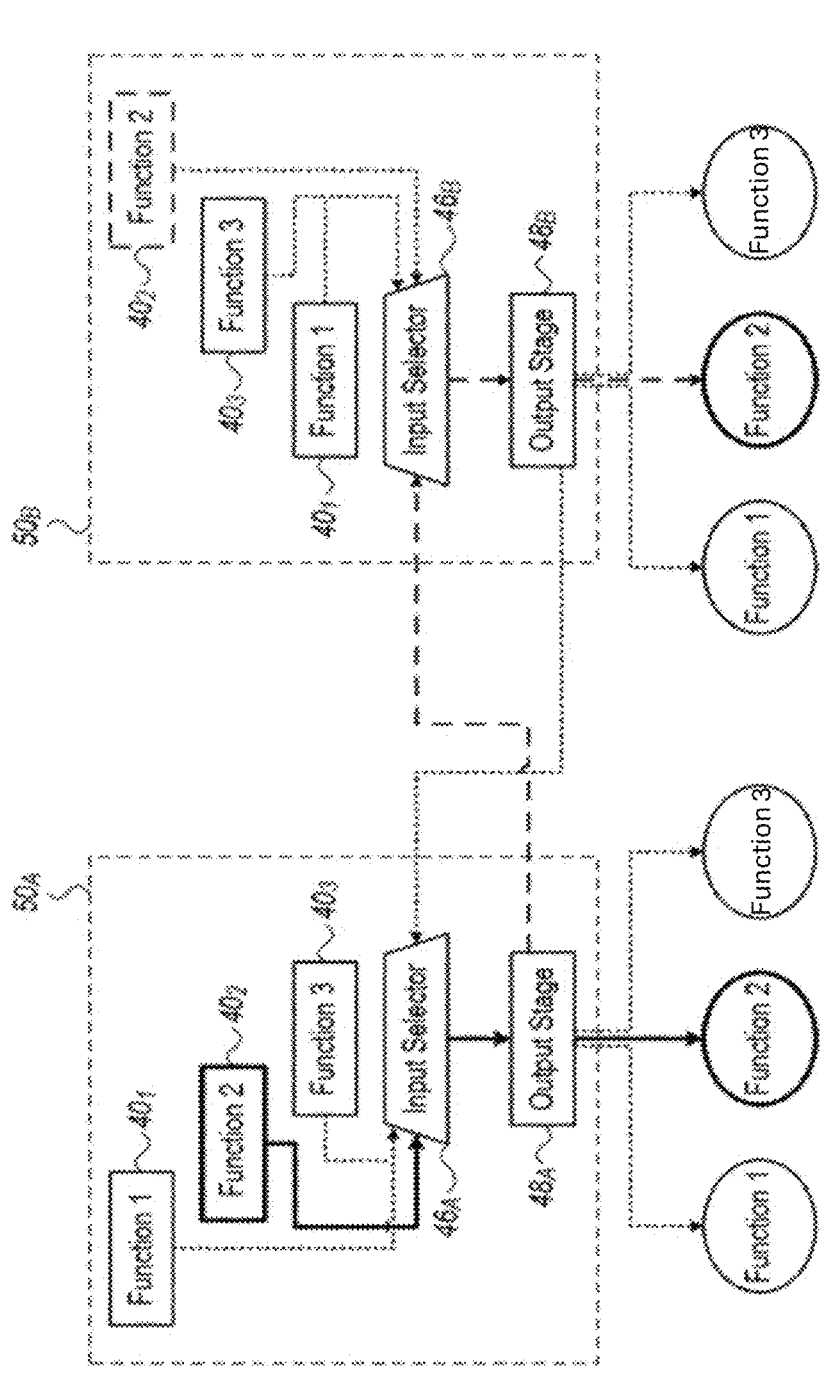
Figure 8C:
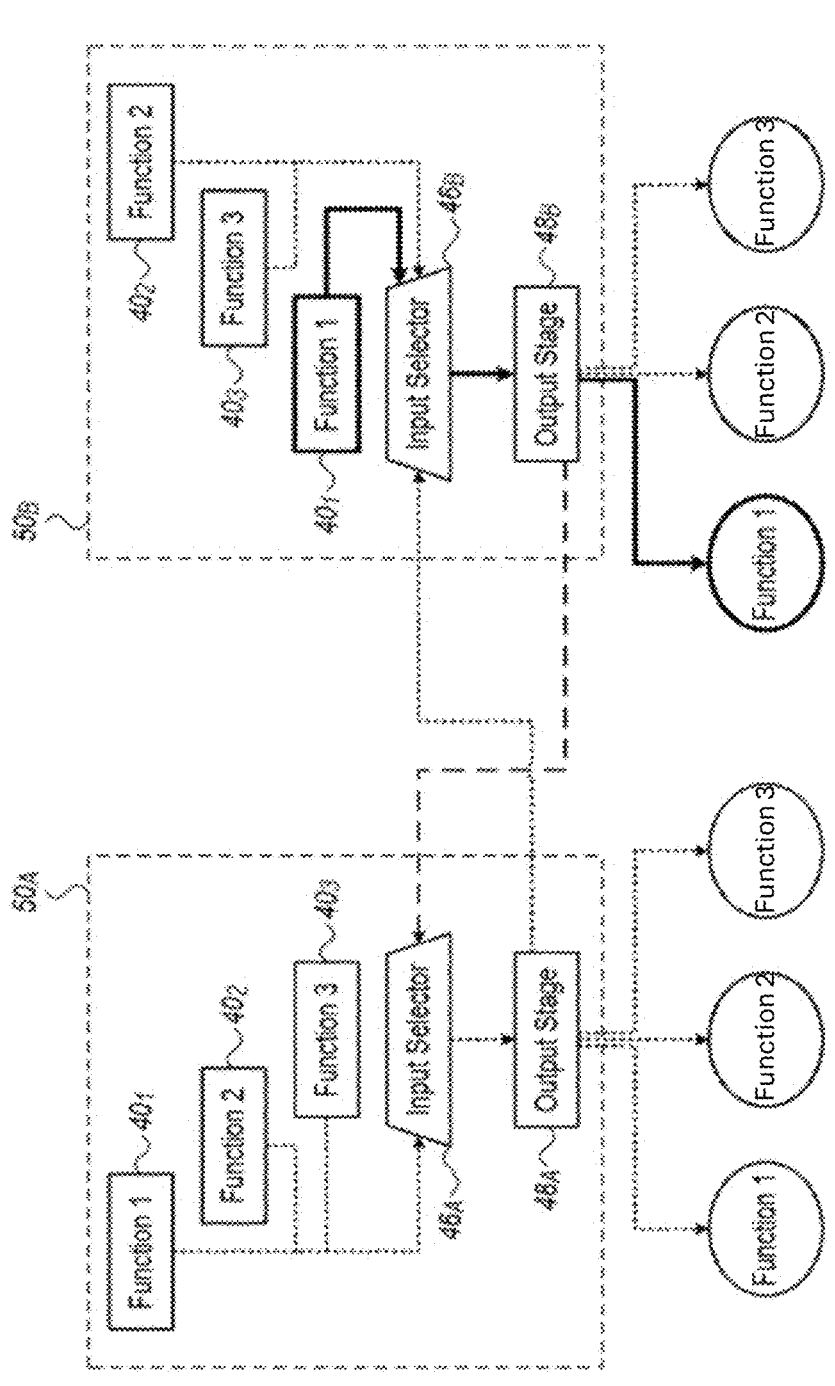

Reference is now made to FIGS. 8A-C.

FIG. 8A illustrates a first non-limiting example of a response, by the VCM-controllers 50A and 50B of FIGS. 7A-7B, to a control-system fault in a scenario similar to use-case example 1 described above. According to the exemplary control-system fault, the first VCM-controller 50A has experienced a controller-level software fault, and the Function 1 instructions issued by first VCM-controller 50A are invalid. This invalidity can be established by one or both of the input selectors 46A, 46B. The response, e.g., a pre-programmed response or a response arrived at by applying programmed machine learning techniques to historical events and/or third-party events to derive an appropriate response, is that the second VCM-controller 50B must take over control of Function 1 in both VCMs. Thus, the second VCM-controller 50B issues Function 1 control instructions which are now the (solid-line) active control path, (a) recognized by the second input selector module 46B as valid and passed on to the output stage module 46B for execution in the second VCM, and (b) propagated to the input selector 46A of the first (and software-failed) VCM-controller 50A and thence to the corresponding output stage 46B for execution in the VCM.

FIG. 8B illustrates a similar example of a response, by the VCM-controllers 50A and 50B of FIGS. 7A-7B, to a control-system fault in a second scenario similar to use-case example 1 described above. According to the exemplary control-system fault, the second VCM-controller 50B has experienced a fault with respect to the Function 2 control module 402. The response, e.g., a pre-programmed response or a response arrived at by applying programmed machine learning techniques to historical events and/or third-party events to derive an appropriate response, is that the first VCM-controller 50A must take over control of Function 2 in both VCMs. Thus, the first VCM-controller 50A issues Function 2 control instructions which are now the (solid-line) active control path, (a) recognized by the second input selector module 46A as valid and passed on to the output stage module 46A for execution in the first VCM, and (b) propagated to the input selector 46B of the second (and failed) VCM-controller 50B and thence to the corresponding output stage 46B for execution in the VCM.

FIG. 8C illustrates an alternate scenario to that of in which VCM-controller 50A undergoes a complete hardware failure, including its Function 1 controller 401, along with input selector 46A and output stage 46B. The response, e.g., a pre-programmed response or a response arrived at by applying programmed machine learning techniques to historical events and/or third-party events to derive an appropriate response, is that the second VCM-controller 50B must take over control of Function 1 in its own VCM. VCM-controller 50B attempts to take over control of Function 1 in the other VCM (of VCM-controller 50A) but is unable to do so. In the absence of 'assistance' from other controllers, VCM-controller 50B will undertake other countermeasures; in an example, Function 1 is the braking function, and VCM-controller 50B can contribute to a safe braking of the vehicle by using the electric drive motor for slowing, and a sharp turning of the wheel to effect the stopping. In another example (not shown), a redundant actuator and/or communication path to an actuator can be provided.

Discussion of VCM-Controllers

In embodiments, each VCM of a vehicle includes a VCM-controller configured to perform control functions with respect to functional sub-systems within the VCM and/or in other VCMs, where 'configured' means that controller includes hardware, software and/or firmware components for performing the control functions. The VCM-controller can include program instructions, e.g., stored on the controller or accessible therefrom, for performing the control functions, or can be programmed to apply machine learning techniques to sensor data, historical events and/or third-party events to derive an appropriate set of control-function instructions. The VCM-controller can be a member of a network of VCM-controllers and can be programmed for acting as part of a control system as described herein-above, and the program instructions executable by proces-sors of the VCM-controller can be directed to perform control functions in accordance with the various embodi-ments of control systems disclosed herein. When a VCM-controller is replaced, e.g., for maintenance or upgrade, the replacement VCM-controller can replace the replaced VCM-controller as a member of the network of VCM-controllers in performing the control functions of the vehi-cle's control system.

Figure 9A:
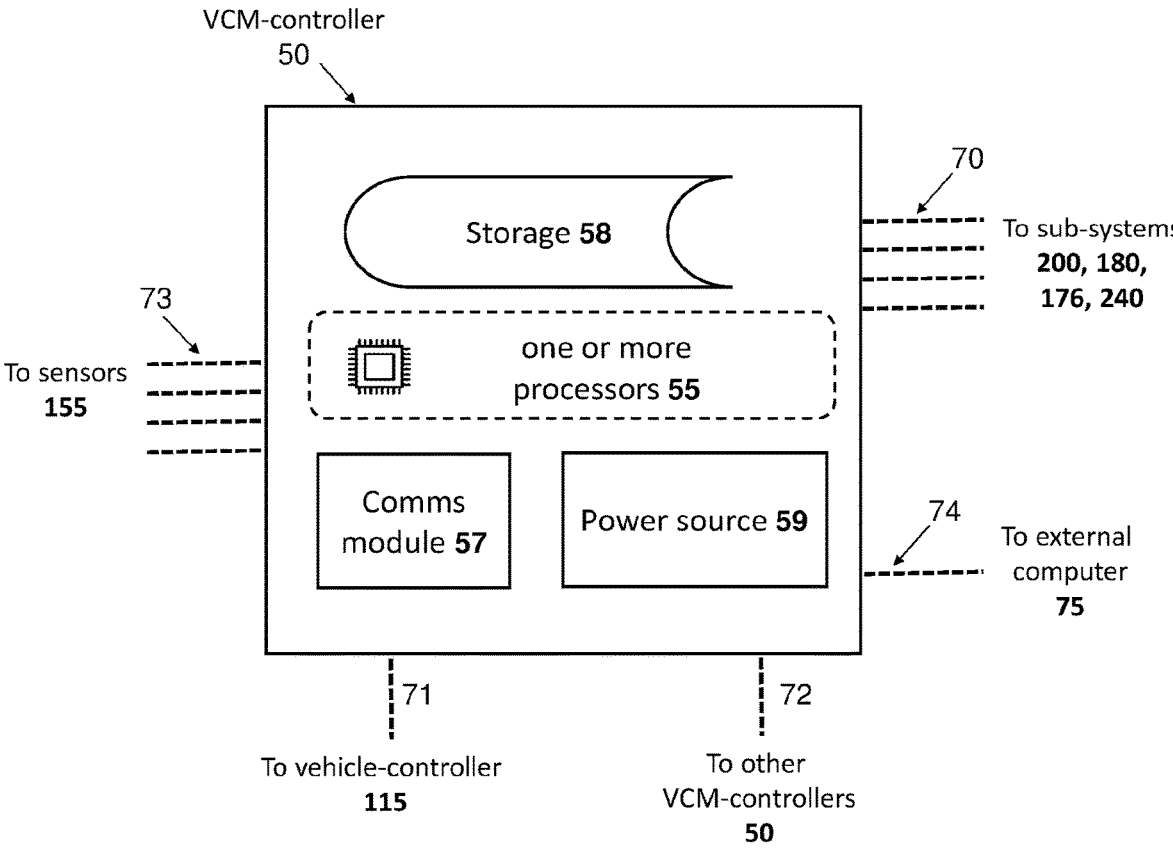

Referring now to FIG. 9A, a VCM-controller 50 accord-ing to embodiments is illustrated schematically to show selected hardware components. The exemplary VCM-con-troller 50 of FIG. 9A includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. In embodiments, the storage 58 can be used for any one or more of: storing program instructions, in firmware and/or software, for execution by the one or more processors 55 of the VCM-controller 50; and historical operating data and/or maintenance data and/or ownership data relating to the VCM and/or any one or more of its sub-systems and their components. The communications module 59 is configured to establish communications links with a vehicle-onboard vehicle controller 115 via communications arrangements 71, to other VCM controllers 50 e.g., VCM controllers 50 of VCMs 150 of the same vehicle 100, via communications arrangements 72, to an external computer 75 via communi-cations arrangements 74 to VCM subsystems 200, 180, 176, (and optionally 240), including to respective sub-system control units via communications arrangements 70, and to sensors 155 e.g., sensors 155 located in/on the VCM 150, via communications arrangements 73. In embodiments, not every VCM-controller 50 includes all of the components shown in FIG. 9A.

Figure 9B:
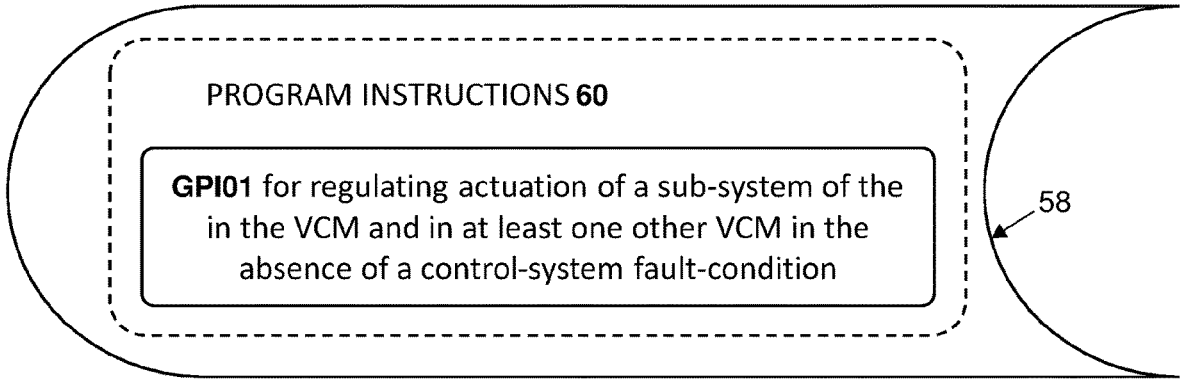

The storage medium 58 of the exemplary VCM controller 50 is shown in FIG. 9B to include program instructions 60 related to operation of a VCM 150 on a vehicle 100. In the example illustrated in FIG. 9B, the program instructions 60 includes a single group of program instructions GPI01 for execution by the one or more processors 55 of the VCM-controller 50:

> Program Instructions GPI01 for regulating actuation of a sub-system of the in the VCM and in at least one other VCM in the absence of a control-system fault-condi-tion. The control function (regulating the actuation of the sub-system) is carried out in response to signals received from outside the VCM. In embodiments, the instructions of GPI01 can include regulating the actua-tion of a first sub-system of the VCM, and exclude regulating the actuation of a second sub-system of the VCM-because under 'normal' conditions, the second sub-system is controller in the VCM by a different VCM-controller. In some embodiments, the instruc-tions of GPI01 can include instructions for regulating the actuation of second first sub-system, but such instructions are not executed in the absence of a control-system fault indicating that a different networked VCM-controller is disabled from regulating actuation of said second sub-system in the VCM. In some embodiments, the instructions of GPI01 can include instructions for regulating the actuation of second first sub-system, but such instructions are not executed if the controller has received a control-system indication that a different networked VCM-controller is enabled to regulate actuation of said second sub-system in the VCM.

In various embodiments, as illustrated in FIG. 10A, the program instructions 60 stored in storage medium 58 of the exemplary VCM controller 50 can additionally include an additional groups of program instructions GPI102, for execution by the one or more processors 55 of the VCM-controller 50:

> Program Instructions GPI02 for regulating actuation of the second sub-system in the VCM. In embodiments, the program instructions of GPI02 are executed in response to an indication of a control-system fault according to which the different VCM-controller (that had been controlling the second sub-system in the VCM before the control-system fault) is now disabled from performing that function. The program instruc-tions GPI02 correspond to control-system fault use-case example 1, discussed hereinabove.

In various embodiments, as illustrated in FIG. 10B, the program instructions 60 stored in storage medium 58 of the exemplary VCM controller 50 can additionally include an additional groups of program instructions GPI103, for execution by the one or more processors 55 of the VCM-controller 50:

> Program Instructions GPI03 for regulating actuation of a given functional sub-system in a different VCM. In embodiments, the program instructions of GPI03 are executed in response to an indication of a control-system fault according to which the respective VCM-controller of the different VCM, which had been con-trolling the given functional sub-system in the different VCM before the control-system fault, is now disabled from performing that function. The program instruc-tions GPI03 correspond to control-system fault use-case example 2, discussed hereinabove.

In various embodiments, as illustrated in FIG. 10C, the program instructions 60 stored in storage medium 58 of the exemplary VCM controller 50 can additionally include an additional groups of program instructions GPI104, for execution by the one or more processors 55 of the VCM-controller 50:

> Program Instructions GPI04 for regulating actuation of the respective subsystems in a different VCM. In embodiments, the program instructions of GPI04 are executed in response to an indication of a control-system fault indicating that the respective VCM con-troller of the different VCM is disabled from regulating actuation of at least one of the sub-systems in the different VCM. In some embodiments, the respective VCM-controller of the different VCM is disabled from regulating actuation of all of the sub-systems in the different VCM before the control-system fault. In some embodiments, a respective VCM-controller of a second different VCM had been controlling at least one of the sub-systems in the different VCM before the control-system fault. In some such embodiments, the program instructions of GPI04 can be executed in response to an indication of a control-system fault indicating that the VCM-controller of the second different VCM is now disabled from perform that at least one control function. The program instructions GPI04 correspond to control-system fault use-case example 3, discussed hereinabove.

In various embodiments, as illustrated in FIG. 10D, the program instructions 60 stored in storage medium 58 of the exemplary VCM controller 50 can additionally include additional groups of program instructions GPI05, for execution by the one or more processors 55 of the VCM-controller 50:

Program Instructions GPI05 for regulating actuation of all subsystems in the VCM. In embodiments, the program instructions of GPI05 are executed in response to an indication of a control-system fault indicating that no other VCM-controllers are enabled to regulate actuation of any sub-systems in the VCM. In some embodiments, one or more of the other VCM-controllers (all of which are members of the network of VCM-controllers) been controlling at least one of the sub-systems in the VCM before the control-system fault. The program instructions GPI03 correspond to control-system fault use-case example 4, discussed hereinabove.

According to embodiments, the program instructions 60 stored in storage medium 58 can include the program instructions of GPI01, in addition to any one or more of the groups of program instructions GPI02, GPI03, GPI04 or GPI05, in any combination.

Discussion of Methods

Referring now to FIG. 11A, a method is disclosed for operating a vehicle 100, e.g., the vehicle 100 of FIG. 1 comprising a plurality of VCMs 150 wherein each comprises at least two functional subsystems as disclosed hereinabove. According to the method, the vehicle 100 comprises a network 30 of VCM-controllers 50. As illustrated by the flow chart in FIG. 11A, the method comprises 1st method steps S01, S02, and S03 to be carried out by a first VCM-controller 50:

Step S01 receiving incoming signals from outside its respective VCM;

Step S02 monitoring the incoming signals for control-system faults; and

Step S03 regulating actuation of a first sub-system in its own respective VCM and in at least one other VCM, in response to the incoming signals and in the absence of a control-system fault.

In some embodiments, the method additionally includes 2nd method steps S11, S12 and S13 to be carried out by a second VCM-controller 50, as illustrated in FIG. 11B:

Step S11 receiving second incoming signals from outside its respective VCM;

Step S12 monitoring the second incoming signals for control-system faults; and

Step S13 regulating actuation of a second sub-system in the respective VCM of the first VCM-controller, in response to the incoming signals and in the absence of a control-system fault.

In some embodiments, the method additionally includes 3rd method steps S21 and S22 to be carried out by the first VCM-controller 50, as illustrated in FIG. 12A:

Step S21 detecting, in the incoming signals, an indication of a control-system fault according to which the second VCM-controller is disabled from regulating actuation of said second sub-system in the VCM (of the first VCM-controller); and Step S22 in response to the indication of the control-system fault, regulating actuation of said second sub-system in the VCM.

The 3rd method steps S21 and S22 correspond to control-system fault use-case example 1, discussed hereinabove.

In some embodiments, the method additionally includes 4th method steps S31 and S32 to be carried out by the first VCM-controller 50, as illustrated in FIG. 12B:

Step S31 detecting, in the incoming signals, an indication of a control-system fault according to which a different networked VCM-controller is disabled from regulating actuation of a given sub-system in its respective VCM; and Step S32 in response to the indication of the control-system fault, regulating actuation of said given sub-system in the respective VCM (of the different networked VCM-controller).

The 4th method steps S31 and S32 correspond to control-system fault use-case example 2, discussed hereinabove.

In some embodiments, the method additionally includes 5th method steps S41 and S42 to be carried out by the first VCM-controller 50, as illustrated in FIG. 12C:

Step S41 detecting, in the incoming signals, an indication of a control-system fault according to which a different networked VCM-controller is disabled from regulating actuation of one or more sub-systems in its respective VCM; and Step S42 in response to the indication of the control-system fault, regulating actuation of the at least two sub-subsystems in the respective VCM (of the different networked VCM-controller).

The 5th method steps S41 and S42 correspond to control-system fault use-case example 3, discussed hereinabove.

In some embodiments, the method additionally includes 6th method steps S51 and S52 to be carried out by the first VCM-controller 50, as illustrated in FIG. 12D:

Step S51 detecting, in the incoming signals, an indication of a control-system fault according to which no other VCM-controllers are enabled to regulate actuation of any sub-systems in the VCM; and Step S52 in response to the indication of the control-system fault, regulating actuation of the at least two subsystems in the VCM.

The 6th method steps S51 and S52 correspond to control-system fault use-case example 4, discussed hereinabove.

According to embodiments, the method can include the 1st method steps, in addition to any one or more of the 2nd, 3rd, 4th, 5th, and 6th method steps, in any combination.

First Additional Discussion

Embodiments of the disclosure relate, inter alia, to the following inventive concepts:

Inventive concept 1. A control system for a vehicle, the vehicle comprising a plurality of vehicle corner modules (VCMs), each VCM comprising at least two subsystems selected from the group of subsystems consisting of a drive subsystem, a steering subsystem, and a braking subsystem, the control system comprising: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM.

Inventive concept 2. The control system of Inventive concept 1, wherein the no-fault operating mode is characterized in that actuation in its own respective VCM of a second sub-system of the at least two sub-systems is regulated by a VCM-controller of a different VCM that is not its own respective VCM.

Inventive concept 3. A control system for a vehicle, the vehicle comprising a plurality of vehicle corner modules (VCMs), each VCM comprising at least two subsystems selected from the group of subsystems consisting of a drive subsystem, a steering subsystem, and a braking subsystem, the control system comprising: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, at least one sub-system of the at least two sub-systems in each respective VCM is regulated by a VCM-controller of a different VCM that is not the respective VCM, in response to the incoming signals.

Inventive concept 4. A control system for a vehicle, the vehicle comprising a plurality of vehicle corner modules (VCMs), each VCM comprising at least two subsystems selected from the group of subsystems consisting of a drive subsystem, a steering subsystem, and a braking subsystem, the control system comprising: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM, the no-fault operating mode being characterized in that actuation in its own respective VCM of a second sub-system of the at least two sub-systems is regulated by a VCM-controller of a different VCM that is not its own respective VCM.

Inventive concept 5. The control system of any preceding Inventive concept, wherein in a first fault-responsive operating mode, each VCM-controller installed in a VCM comprising said second sub-system regulates actuation of said second sub-system in its own respective VCM, the first fault-responsive operating mode being characterized by the VCM-controller of the different VCM that is not its own respective VCM being disabled from regulating actuation of said second sub-system in the own respective VCM.

Inventive concept 6. The control system of any preceding Inventive concept, wherein in a second fault-responsive operating mode, a VCM-controller of a given VCM regulates actuation of a given sub-system of the at least two sub-subsystems in a different VCM that is not the given VCM, the second fault-responsive operating mode being characterized by the VCM controller of the different VCM being disabled from regulating actuation, in the different VCM, of said given sub-system.

Inventive concept 7. The control system of any preceding Inventive concept, wherein in a third fault-responsive operating mode, a VCM controller of a given VCM regulates actuation of the respective at least two subsystems in a different VCM that is not the given VCM, the third fault-responsive operating mode being characterized by the VCM controller of the different VCM being disabled from regulating actuation of one or more of the at least two sub-systems in the different VCM.

Inventive concept 8. The control system of any preceding Inventive concept, wherein in a fourth fault-responsive operating mode, a VCM controller of a given VCM regulates actuation of the at least two subsystems in the given VCM, the fourth fault-responsive mode being characterized by a plurality of VCM-controllers of different respective VCMs, none of which are the given VCM, being disabled from regulating actuation of respective sub-systems of the at least two sub-systems in the respective VCM.

Inventive concept 9. The control system of any preceding Inventive concept, wherein said first sub-system is selected in accordance with an operating profile assigned to the respective VCM.

Inventive concept 10. The control system of any preceding Inventive concept, wherein the incoming signals are selected from the group of signals comprising electrical, electronic, and optically-transmitted signals.

Inventive concept 11. A vehicle comprising the control system of any preceding Inventive concept.

Inventive concept 12. A controller for installation onboard a vehicle corner module (VCM), the VCM comprising at least two subsystems selected from the group of subsystems consisting of a drive subsystem, a steering subsystem, and a braking subsystem, the controller comprising: a. communications arrangements for establishing electronic communication (i) with respective controllers of other VCMs so as to join a control-system network of networked VCM-controllers, and (ii) with each one of the at least two subsystems in the VCM and in at least one other VCM: b. one or more processors; and c. a computer-readable medium storing program instructions that, when executed by the one or more processors, cause the one or more processors to regulate, in the absence of a control-system fault-condition and responsively to incoming signals received from outside the VCM, actuation of a first sub-system of the at least two sub-systems in the VCM and in at least one other VCM.

Inventive concept 13. The controller of Inventive concept 12, wherein there exists a second sub-system of the at least two sub-systems in the VCM, the actuation of which is not regulated by the one or more processors when the stored program instructions are executed by the one or more processors, in the absence of a control-system fault indicating that a different networked VCM-controller is disabled from regulating actuation of said second sub-system in the VCM.

Inventive concept 14. The controller of Inventive concept 12, wherein there exists a second sub-system of the at least two sub-systems in the VCM, the actuation of which is not regulated by the one or more processors when the stored program instructions are executed by the one or more processors, subject to the VCM-controller receiving a control-system indication that a different networked VCM-controller is enabled to regulate actuation of said second sub-system in the VCM.

Inventive concept 15. The controller of either one of Inventive concepts 13 or 14, wherein the computer-readable medium additionally stores program instructions that, when executed by the one or more processors, cause the one or more processors to regulate actuation of said second sub-system in the VCM, responsively to a control-system fault indicating that the different VCM-controller is disabled from regulating actuation of said second sub-system in the VCM.

Inventive concept 16. The controller of any one of Inventive concepts 12 to 15, wherein the computer-readable medium additionally stores program instructions that, when executed by the one or more processors, cause the one or more processors to regulate actuation of a given sub-system of the at least two sub-subsystems in a different VCM comprising a respective networked VCM-controller, responsively to a control-system fault indicating that the respective VCM controller of the different VCM is disabled from regulating actuation of said given sub-system in the different VCM.

Inventive concept 17. The controller of any one of Inventive concepts 12 to 16, wherein the computer-readable medium additionally stores program instructions that, when executed by the one or more processors, cause the one or more processors to regulate actuation of the respective at least two subsystems in a different VCM comprising a respective networked VCM-controller, responsively to a control-system fault indicating that the respective VCM controller of the different VCM is disabled from regulating actuation of one or more of the at least two sub-systems in the different VCM.

Inventive concept 18. The controller of any one of Inventive concepts 12 to 17, wherein the computer-readable medium additionally stores program instructions that, when executed by the one or more processors, cause the one or more processors to regulation actuation of the at least two subsystems in the VCM, responsively to a control-system fault indicating that no other VCM-controllers of the network of VCM-controllers are enabled to regulate actuation of any sub-systems of the at least two subsystems in the VCM.

Inventive concept 19. The controller of any one of Inventive concepts 12 to 18, wherein the incoming signals are selected from the group of signals comprising electrical, electronic, and optically-transmitted signals.

Inventive concept 20. A VCM comprising the controller of any one of Inventive concepts 12 to 19.

Inventive concept 21. A control system for a vehicle, comprising the controller of any one of Inventive concepts 12 to 19.

Inventive concept 22. A vehicle comprising at least one pair of VCMs according to Inventive concept 20.

Inventive concept 23. A vehicle comprising the control system of Inventive concept 21.

Inventive concept 24. A method of operating a vehicle, the vehicle comprising (i) at least one pair of vehicle corner modules (VCMs), each VCM comprising at least two sub-systems selected from the group of subsystems consisting of a drive subsystem, a steering subsystem, and a braking subsystem, and (ii) a network of networked VCM-controllers, each VCM-controller being (A) onboard and installed within a different respective VCM, and (B) in electronic communication with each one of the at least two subsystems of its respective VCM and with other VCM-controllers of the network of VCM-controllers, the method comprising the following steps carried out by a first VCM-controller of the network of VCM-controllers: receiving incoming signals from outside its respective VCM: monitoring the incoming signals for control-system faults; and in response to the incoming signals and in the absence of a control-system fault, regulating actuation of a first sub-system of the at least two sub-systems in its own respective VCM and in at least one other VCM comprising a respective networked VCM-controller.

Inventive concept 25. The method of Inventive concept 24, further comprising the following steps carried out by a second VCM-controller of the network of VCM-controllers: receiving second incoming signals from outside its respective VCM; monitoring the second incoming signals for control-system faults; and in response to the second incoming signals and in the absence of a control-system fault, regulating actuation of a second sub-system of the at least two sub-systems in the respective VCM of the first VCM-controller.

Inventive concept 26. The method of Inventive concept 25, further comprising the following steps carried out by the first VCM-controller: detecting, in the incoming signals, an indication of a control-system fault according to which the second VCM-controller is disabled from regulating actuation of said second sub-system in the VCM; and in response to the indication of the control-system fault, regulating actuation of said second sub-system in the VCM.

Inventive concept 27. The method of any one of Inventive concepts 24 to 26, further comprising the following steps carried out by the first VCM-controller: detecting, in the incoming signals, an indication of a control-system fault according to which a different networked VCM-controller is disabled from regulating actuation of a given sub-system of the at least two sub-subsystems in its respective VCM; and in response to the indication of the control-system fault, regulating actuation of said given sub-system in the respective VCM.

Inventive concept 28. The method of any one of Inventive concepts 24 to 27, further comprising the following steps carried out by the first VCM-controller: detecting, in the incoming signals, an indication of a control-system fault according to which a different networked VCM-controller is disabled from regulating actuation of one or more sub-systems of the at least two sub-subsystems in its respective VCM: and in response to the indication of the control-system fault, regulating actuation of the at least two sub-subsystems in the respective VCM.

Inventive concept 29. The method of any one of Inventive concepts 24 to 28, further comprising the followings steps carried out by the first VCM-controller: detecting, in the incoming signals, an indication of a control-system fault according to which no other VCM-controllers of the network of VCM-controllers are enabled to regulate actuation of any sub-systems of the at least two subsystems in the VCM; and in response to the indication of the control-system fault, regulating actuation of the at least two sub-systems in the VCM.

Inventive concept 30. The method of any one of Inventive concepts 24 to 29, wherein the incoming signals are selected from the group of signals comprising electrical, electronic, and optically-transmitted signals.

Second Additional Discussion

Embodiments of the disclosure may further relate to any one or more of the following inventive concepts in any combination, including in combination with any of the inventive concepts of the first additional discussion.

Inventive concept 31: A control system for a vehicle, the vehicle comprising a plurality of vehicle corner modules (VCMs), each VCM comprising at least two subsystems selected from a drive subsystem, a steering subsystem, and a braking subsystem, the control system comprising: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein (i) the control system provides a no-fault operating mode defined by the absence of a control-system fault, and (ii) a VCM-controller of a first VCM is programmed to control, when operating in the no-fault operating mode, at least one subsystem in a second VCM.

Inventive concept 32. The control system of Inventive concept 31, wherein in the no-fault operating mode each VCM controller regulates, in response to the incoming signals, actuation of a first sub-system of the at least two sub-systems in its own respective VCM and a first sub-system of the respective at least two sub-systems in at least one other VCM.

Inventive concept 33. The control system of Inventive concept 31, wherein the no-fault operating mode is characterized in that actuation in its own respective VCM of a second sub-system of the at least two sub-systems is regulated by a VCM-controller of a different VCM that is not its own respective VCM.

Inventive concept 34. The control system of Inventive concept 31, wherein in the no-fault operating mode, at least one sub-system of the at least two sub-systems in each respective VCM is regulated by a VCM-controller of a different VCM that is not the respective VCM, in response to the incoming signals.

Inventive concept 35. The control system of Inventive concept 31, wherein in a first fault-responsive operating mode, a VCM-controller installed in the second VCM regulates actuation of a given sub-system in the second VCM, the first fault-responsive operating mode being characterized by the VCM-controller of the first VCM being disabled from regulating actuation of said second sub-system in the second VCM.

Inventive concept 36. The control system of Inventive concept 31, wherein in a second fault-responsive operating mode, a VCM-controller of a given VCM regulates actuation of a given sub-system of the at least two sub-subsystems in a different VCM that is not the given VCM, the second fault-responsive operating mode being characterized by the VCM controller of the different VCM being disabled from regulating actuation, in the different VCM, of said given sub-system.

Inventive concept 37. The control system of Inventive concept 31, wherein in a third fault-responsive operating mode, a VCM controller of a given VCM regulates actuation of the respective at least two subsystems in a different VCM that is not the given VCM, the third fault-responsive operating mode being characterized by the VCM controller of the different VCM being disabled from regulating actuation of one or more of the respective at least two sub-systems in the different VCM.

Inventive concept 38. The control system of Inventive concept 31, wherein in a fourth fault-responsive operating mode, a VCM controller of a given VCM regulates actuation of the at least two subsystems in a given VCM, the fourth fault-responsive mode being characterized by a plurality of VCM-controllers of different respective VCMs, none of which are the given VCM, being disabled from regulating actuation of respective sub-systems of the at least two sub-systems in the respective VCM.

Inventive concept 39. The control system of Inventive concept 31, wherein said first sub-system is selected in accordance with an operating profile assigned to the respective VCM.

Inventive concept 40. A controller for installation onboard a vehicle corner module (VCM), the VCM comprising at least two subsystems selected from a drive subsystem, a steering subsystem, and a braking subsystem, the controller comprising: a. communications arrangements for establishing electronic communication (i) with respective controllers of other VCMs so as to join a control-system network of networked VCM-controllers, and (ii) with each one of the at least two subsystems in the VCM and in at least one other VCM: b. one or more processors; and c. a computer-readable medium storing program instructions that, when executed by the one or more processors, cause the one or more processors to regulate, in the absence of a control-system fault-condition and responsively to incoming signals received from outside the VCM, actuation of a first sub-system of the at least two sub-systems in the VCM and a first sub-system of the respective at least two sub-systems in at least one other VCM.

Inventive concept 41. The controller of Inventive concept 40, wherein there exists a second sub-system of the at least two sub-systems in the VCM, the actuation of which is not regulated by the one or more processors, when the stored program instructions are executed by the one or more processors, in the absence of a control-system fault indicating that a different networked VCM-controller is disabled from regulating actuation of said second sub-system in the VCM.

Inventive concept 42. The controller of Inventive concept 40, wherein there exists a second sub-system of the at least two sub-systems in the VCM, the actuation of which is not regulated by the one or more processors when the stored program instructions are executed by the one or more processors, subject to the VCM-controller receiving a control-system indication that a different networked VCM-controller is enabled to regulate actuation of said second sub-system in the VCM.

Inventive concept 43. The controller of Inventive concept 41, wherein the computer-readable medium additionally stores program instructions that, when executed by the one or more processors, cause the one or more processors to regulate actuation of said second sub-system in the VCM responsively to a control-system fault indicating that the different VCM-controller is disabled from regulating actuation of said second sub-system in the VCM.

Inventive concept 44. The controller of Inventive concept 40, wherein the computer-readable medium additionally stores program instructions that, when executed by the one or more processors, cause the one or more processors to regulate actuation of a given sub-system of the at least two sub-subsystems in a different VCM comprising a respective networked VCM-controller, responsively to a control-system fault indicating that the respective VCM controller of the different VCM is disabled from regulating actuation of said given sub-system in the different VCM.

Inventive concept 45. The controller of Inventive concept 40, wherein the computer-readable medium additionally stores program instructions that, when executed by the one or more processors, cause the one or more processors to regulate actuation of the respective at least two subsystems in a different VCM comprising a respective networked VCM-controller, responsively to a control-system fault indicating that the respective VCM controller of the different VCM is disabled from regulating actuation of one or more of the respective at least two sub-systems in the different VCM.

Inventive concept 46. The controller of Inventive concept 40, wherein the computer-readable medium additionally stores program instructions that, when executed by the one or more processors, cause the one or more processors to regulation actuation of the at least two subsystems in the VCM, responsively to a control-system fault indicating that no other VCM-controllers of the network of VCM-controllers are enabled to regulate actuation of any sub-systems of the at least two subsystems in the VCM.

Inventive concept 47. A control system for a vehicle, comprising the controller of Inventive concept 40.

Inventive concept 48. A method of operating a vehicle, the vehicle comprising (i) at least one pair of vehicle corner modules (VCMs), each VCM comprising at least two subsystems selected from a drive subsystem, a steering subsystem, and a braking subsystem, and (ii) a network of networked VCM-controllers, each VCM-controller being (A) onboard and installed within a different respective VCM, and (B) in electronic communication with each one of the at least two subsystems of its respective VCM and with other VCM-controllers of the network of VCM-controllers, the method comprising the following steps carried out by a first VCM-controller of the network of VCM-controllers: receiving incoming signals from outside its respective VCM: monitoring the incoming signals for control-system faults; and in response to the incoming signals and in the absence of a control-system fault, regulating actuation of at least one subsystem in a second VCM that is not its own respective VCM.

Inventive concept 49. The method of Inventive concept 48, wherein the regulating includes regulating actuation of a first sub-system of the at least two sub-systems in its own respective VCM and a first sub-system of the respective at least two sub-systems in at least one other VCM comprising a respective networked VCM-controller.

Inventive concept 50. The method of Inventive concept 49, further comprising the following steps carried out by a second VCM-controller of the network of VCM-controllers: receiving second incoming signals from outside its respective VCM: monitoring the second incoming signals for control-system faults; and in response to the second incoming signals and in the absence of a control-system fault, regulating actuation of a second sub-system of the at least two sub-systems in the respective VCM of the first VCM-controller.

Inventive concept 51. The method of Inventive concept 50, further comprising the following steps carried out by the first VCM-controller: detecting, in the incoming signals, an indication of a control-system fault according to which the second VCM-controller is disabled from regulating actuation of said second sub-system in the VCM; and in response to the indication of the control-system fault, regulating actuation of said second sub-system in the VCM.

Inventive concept 52. The method of Inventive concept 48, further comprising the following steps carried out by the first VCM-controller: detecting, in the incoming signals, an indication of a control-system fault according to which a different networked VCM-controller is disabled from regulating actuation of a given sub-system of the at least two sub-subsystems in its respective VCM; and in response to the indication of the control-system fault, regulating actuation of said given sub-system in the respective VCM.

Inventive concept 53. The method of Inventive concept 48, further comprising the following steps carried out by the first VCM-controller: detecting, in the incoming signals, an indication of a control-system fault according to which a different networked VCM-controller is disabled from regulating actuation of one or more sub-systems of the at least two sub-subsystems in its respective VCM; and in response to the indication of the control-system fault, regulating actuation of the at least two sub-subsystems in the respective VCM.

54. The method of Inventive concept 48, further comprising the followings steps carried out by the first VCM-controller: detecting, in the incoming signals, an indication of a control-system fault according to which no other VCM-controllers of the network of VCM-controllers are enabled to regulate actuation of any sub-systems of the at least two subsystems in the VCM; and in response to the indication of the control-system fault, regulating actuation of the at least two subsystems in the VCM.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A power distribution system for an electrically-powered vehicle comprising at least one onboard power source, a first vehicle corner module (VCM) coupled to a first side of a reference frame of the vehicle and a second VCM coupled to an opposing second side of the reference frame, each VCM comprising a VCM controller, a steering subsystem, a drive subsystem, and a braking subsystem, the power distribution system comprising a first power bus and a second power bus electrically connecting the at least one onboard power source with the first VCM and the second VCM, such that:

i. the first power bus delivers electric power to the first VCM and to a steering motor, an actuator and/or an inverter of the steering system of the second VCM, and ii. the second power bus delivers electric power to the second VCM and to a steering motor, an actuator and/or an inverter of the steering system of the first VCM.

2. The power distribution system of claim 1, wherein the electrically-powered vehicle additionally comprises the reference frame having VCMs the first VCM and the second VCM coupled to the reference frame.

3. The power distribution system of claim 1, wherein the vehicle additionally comprises a third VCM and a fourth VCM, the first VCM and the third VCM being coupled to the first side of the reference frame and the second VCM and the fourth VCM being coupled to the opposing second side thereof, the first power bus and the second power bus further electrically connecting the at least one onboard power source with the third VCM and the fourth VCM, such that:

i. the first power bus delivers electric power to the first VCM and the fourth VCM, and ii. the second power bus delivers electric power to the second VCM and the third VCM.

4. The power distribution system of claim 3, wherein i. the first power bus additionally delivers electric power to the steering motor, the actuator and/or the inverter of the steering system of the third VCM, and ii. the second power bus additionally delivers electric power to the steering motor, the actuator and/or the inverter of the steering system of the fourth VCM.

5. The power distribution system of claim 3, wherein the braking subsystems of the first VCM and the fourth VCM are not in electrical connection with the second power bus, and the braking subsystems of the second VCM and the third VCM are not in electrical connection with the first power bus.

6. The power distribution system of claim 3, wherein the electrically-powered vehicle additionally comprises the reference frame having coupled thereto the first VCM and the second VCM comprising front wheels of the electrically-powered vehicle, and the third VCM and the fourth VCM comprising respective rear wheels of the electrically-powered vehicle.

7. The power distribution system of claim 6, wherein each VCM comprises at least two of the drive subsystem, the steering subsystem, and the braking subsystem, the vehicle comprising a control system comprising a network of VCM-controllers, each VCM-controller being (i) onboard and installed within a VCM of the first VCM, the second VCM, the third VCM and the fourth VCM, and (ii) operatively linked to each one of at least two subsystems of the steering subsystem, the drive subsystem, and the braking subsystem of said VCM to receive therefrom sensor data and to regulate operation thereof in response to incoming signals received from outside of said VCM.

8. The power distribution system of claim 7, wherein in a control-system no-fault operating mode defined by the absence of a control-system fault, each VCM controller regulates, in response to the incoming signals, actuation of a first sub-system of the at least two sub-systems in its own VCM and in at least one other VCM of the first VCM, the second VCM, the third VCM and the fourth VCM.

9. The power distribution system of claim 8, wherein the control-system no-fault operating mode is characterized in that actuation in its own VCM of a second sub-system of the at least two sub-systems is regulated by the VCM-controller of a different VCM of the first VCM, the second VCM, the third VCM and the fourth VCM that is not its own VCM.

10. The power distribution system of claim 7, wherein in a control-system no-fault operating mode defined by the absence of a control-system fault, at least one sub-system of the at least two sub-systems in each VCM of the first VCM, the second VCM, the third VCM and the fourth VCM is regulated by the VCM-controller of a different VCM of the first VCM, the second VCM, the third VCM and the fourth VCM that is not its own VCM, in response to the incoming signals.

11. The power distribution system of claim 7, wherein in a control-system no-fault operating mode defined by the absence of a control-system fault, each VCM controller regulates, in response to the incoming signals, actuation of a first sub-system of the at least two sub-systems in its own respective VCM and in at least one other VCM of the first VCM, the second VCM, the third VCM and the fourth VCM, the no-fault operating mode being characterized in that actuation in its own VCM of a second sub-system of the at least two sub-systems is regulated by the VCM-controller of a different VCM of the first VCM, the second VCM, the third VCM and the fourth VCM that is not its own VCM.

12. The power distribution system of claim 7, wherein in a first control-system fault-responsive operating mode, each VCM-controller installed in a VCM of the first VCM, the second VCM, the third VCM and the fourth VCM and comprising said second sub-system regulates actuation of said second sub-system in its own VCM, the first fault-responsive operating mode being characterized by the VCM-controller of a different VCM of the first VCM, the second VCM, the third VCM and the fourth VCM that is not its own VCM being disabled from regulating actuation of said second sub-system in its own VCM.

13. The power distribution system of claim 7, wherein in a second control-system fault-responsive operating mode, the VCM-controller of a given VCM of the first VCM, the second VCM, the third VCM and the fourth VCM regulates actuation of a given sub-system of the at least two sub-subsystems in a different VCM of the first VCM, the second VCM, the third VCM and the fourth VCM that is not the given VCM, the second fault-responsive operating mode being characterized by the VCM controller of the different VCM being disabled from regulating actuation, in the different VCM, of said given sub-system.

14. The power distribution system of claim 7, wherein in a third control-system fault-responsive operating mode, the VCM controller of a given VCM of the first VCM, the second VCM, the third VCM and the fourth VCM regulates actuation of the at least two subsystems in a different VCM of the first VCM, the second VCM, the third VCM and the fourth VCM that is not the given VCM, the third fault-responsive operating mode being characterized by the VCM controller of the different VCM being disabled from regulating actuation of one or more of the at least two subsystems in the different VCM.

15. The power distribution system of claim 7, wherein in a fourth control-system fault-responsive operating mode, the VCM controller of a given VCM of the first VCM, the second VCM, the third VCM and the fourth VCM regulates actuation of the at least two subsystems in the given VCM, the fourth fault-responsive mode being characterized by the VCM-controllers of different VCMs of the first VCM, the second VCM, the third VCM and the fourth VCM, none of which are the given VCM, being disabled from regulating actuation of sub-systems of the at least two sub-systems in the given VCM.

16. The power distribution system of claim 7, wherein each VCM-controller comprises communications arrangements configured for (i) establishing electronic communication with the VCM-controllers of other VCMs of the first VCM, the second VCM, the third VCM and the fourth VCM so as to join a control-system network of networked VCM-controllers, and (ii) with each one of the at least two subsystems in a given VCM of the first VCM, the second VCM, the third VCM and the fourth VCM and in at least one other VCM of the first VCM, the second VCM, the third VCM and the fourth VCM, and each VCM controller is programmed to regulate, in the absence of a control-system fault-condition and responsively to incoming signals received from outside the given VCM, actuation of a first sub-system in the at least one other VCM.

17. The power distribution system of claim 16, wherein there exists a second sub-system of the at least two sub-systems in the VCM, the actuation of which is not regulated by the VCM-controller in the absence of a control-system fault indicating that a different networked VCM-controller is disabled from regulating actuation of said second sub-system in the VCM.

18. The power distribution system of claim 16, wherein there exists a second sub-system of the at least two sub-systems in the VCM, the actuation of which is not regulated by the VCM-controller, subject to the VCM-controller receiving a control-system indication that a different networked VCM-controller is enabled to regulate actuation of said second sub-system in the VCM.

* * * * *